US007020133B2

United States Patent
Zhao et al.

(10) Patent No.: US 7,020,133 B2
(45) Date of Patent: Mar. 28, 2006

(54) SWITCH QUEUE PREDICTIVE PROTOCOL (SQPP) BASED PACKET SWITCHING METHOD

(75) Inventors: Yongdong Zhao, Plano, TX (US); Craig A. Lindahl, McKinney, TX (US)

(73) Assignee: Integrated Device Technology, San Jose, CA (US)

( * ) Notice: Subject to any disclaimer, the term of this patent is extended or adjusted under 35 U.S.C. 154(b) by 903 days.

(21) Appl. No.: 10/037,433

(22) Filed: Jan. 3, 2002

(65) Prior Publication Data

US 2003/0123455 A1 Jul. 3, 2003

(51) Int. Cl.
*H04L 12/56* (2006.01)
(52) U.S. Cl. ........................... 370/371; 370/414
(58) Field of Classification Search ................ 370/370, 370/371, 413, 414
See application file for complete search history.

(56) References Cited

U.S. PATENT DOCUMENTS

| | | |
|---|---|---|
| 5,544,163 A | 8/1996 | Madonna |
| 5,790,546 A | 8/1998 | Dobbins et al. |
| 5,864,542 A | 1/1999 | Gupta et al. |
| 6,046,979 A | 4/2000 | Bauman |
| 6,151,301 A | 11/2000 | Holden |
| 6,167,452 A | 12/2000 | Manning et al. |
| 6,747,954 B1 * | 6/2004 | Petersen et al. ............ 370/236 |

OTHER PUBLICATIONS

"Implementing Distributed Packet Fair Queueing in a Scalable Switch Architecture" by Donpaul C. Stephens and Hui Zhang; Jul., 1998 IEEE; 9 pgs.
"A New Architecture for Switch and Router Design", PMC-Sierra, Inc.; Dec. 22, 1999 v2rl; p. 1-8.
"Line Card to Switch (LCS) Protocol", PMC-Sierra, Inc.; printed from website Jul. 3, 2001; 5 pgs.
ATLAS I Overview Tranparencies (ICS-FORTH, ATM switch) by ICS-FORTH, Crete, Greece; pp. 1-6.

* cited by examiner

*Primary Examiner*—Chau Nguyen
*Assistant Examiner*—Michael Chuen
(74) *Attorney, Agent, or Firm*—Bever, Hoffman & Harms

(57) ABSTRACT

A switch queue predictive protocol (SQPP) includes a packet switching system including: a switch fabric having a cross-point switch, and a plurality of line cards, each coupled to the switch fabric. A cross-point buffer is located at each cross-point of the cross-point switch. The switch fabric also includes a plurality of actual available queue space tables (AAQSTs), each identifying the actual queue space available in a row of the cross-point buffers. Each of the line cards includes an input buffer, an output buffer, and a predicted available queue space table (PAQST) identifying predicted queue space available in a corresponding row of the cross-point buffers. Packet information is transmitted from a source line card to the switch fabric only if available queue space is predicted by the corresponding PAQST. The switch fabric uses the AAQST to update the PAQST after packet information is transmitted to a destination line card.

17 Claims, 12 Drawing Sheets

INGRESS USER SWITCHING TAG FOR UNICAST IFRAMES

501A

| C1 (1-bit) | C2 (1-bit) | M=0 (1-bit) | E=0 (1-bit) | F (1-bit) | L (1-bit) | EGRESS PORT QoS (2-bit) |
|---|---|---|---|---|---|---|
| \multicolumn{7}{|c|}{EGRESS SWITCH PORT ID (8-bit)} |
| \multicolumn{7}{|c|}{FLOW ID (8-bit)} |
| \multicolumn{7}{|c|}{FLOW ID (8-bit)} |
| FLOW ID (6-bit) | | | | | RESERVED = 00 (2-bit) | |
| \multicolumn{7}{|c|}{TEC (CRC OR PARITY CHECK) (8-bit)} |

FIG. 5A

INGRESS USER SWITCHING TAG FOR MULTI-CAST IFRAMES

501B

| C1 (1-bit) | C2 (1-bit) | M=1 (1-bit) | E=0 (1-bit) | F (1-bit) | L (1-bit) | EGRESS PORT QOS (2-bit) |
|---|---|---|---|---|---|---|
| \multicolumn{7}{|c|}{16-bit DIRECT MULTI-CAST EGRESS SWITCH PORT IDs (8-bit)} |
| \multicolumn{7}{|c|}{16-bit DIRECT MULTI-CAST EGRESS SWITCH PORT IDs (8-bit)} |
| \multicolumn{7}{|c|}{14-bit MCID CONTINUED (8-bit)} |
| 14-bit MCID CONTINUED (6-bit) | | | | | RESERVED = 00 (2-bit) | |
| \multicolumn{7}{|c|}{TEC (CRC OR PARITY CHECK) (8-bit)} |

FIG. 5B

EGRESS USER SWITCHING TAG FOR
UNICAST IFRAMES

601A

| C1 (1-bit) | C2 (1-bit) | M=0 (1-bit) | E=0 (1-bit) | F (1-bit) | L (1-bit) | PQS UPDATE QOS (2-bit) |
|---|---|---|---|---|---|---|
| PQS UPDATE ID (8-bit) ||||||||
| 22-bit FLOW ID (8-bit) ||||||||
| 22-bit FLOW ID (8-bit) ||||||||
| 22-bit FLOW ID (6-bit) |||||| RESERVED = 00 (2-bit) ||
| TEC (CRC OR PARITY CHECK) (8-bit) ||||||||

FIG. 6A

EGRESS USER SWITCHING TAG FOR
MULTI-CAST IFRAMES

601B

| C1 (1-bit) | C2 (1-bit) | M=1 (1-bit) | E=0 (1-bit) | F (1-bit) | L (1-bit) | PQS UPDATE QOS (2-bit) |
|---|---|---|---|---|---|---|
| PQS UPDATE ID (8-bit) ||||||||
| RESERVED = 0000 0000 (8-bits) ||||||||
| 14-bit MCID CONTINUED (8-bit) ||||||||
| 14-bit MCID CONTINUED (6-bit) |||||| RESERVED = 00 (2-bit) ||
| TEC (CRC OR PARITY CHECK) (8-bit) ||||||||

FIG. 6B

AAQST$_J$ TABLE UPDATE

| C1=1 (1-bit) | C2=1 (1-bit) | M=0 (1-bit) | E=0 (1-bit) | F=0 (1-bit) | L=0 (1-bit) | TYPE=00 (2-bit) ||
|---|---|---|---|---|---|---|---|
| 4-bit AQS$_{J,1,1}$ UPDATE INCREMENT ||||| 4-bit AQS$_{J,1,2}$ UPDATE INCREMENT |||
| 4-bit AQS$_{J,1,3}$ UPDATE INCREMENT ||||| 4-bit AQS$_{J,1,4}$ UPDATE INCREMENT |||
| 4-bit AQS$_{J,2,1}$ UPDATE INCREMENT ||||| 4-bit AQS$_{J,2,2}$ UPDATE INCREMENT |||
| 4-bit AQS$_{J,2,3}$ UPDATE INCREMENT ||||| 4-bit AQS$_{J,2,4}$ UPDATE INCREMENT |||
| • • • ||||||||
| 4-bit AQS$_{J,15,1}$ UPDATE INCREMENT ||||| 4-bit AQS$_{J,15,2}$ UPDATE INCREMENT |||
| 4-bit AQS$_{J,15,3}$ UPDATE INCREMENT ||||| 4-bit AQS$_{J,15,4}$ UPDATE INCREMENT |||
| 4-bit AQS$_{J,16,1}$ UPDATE INCREMENT ||||| 4-bit AQS$_{J,16,2}$ UPDATE INCREMENT |||
| 4-bit AQS$_{J,16,3}$ UPDATE INCREMENT ||||| 4-bit AQS$_{J,16,4}$ UPDATE INCREMENT |||
| TEC (CRC OR PARITY CHECK) (8-bit) ||||||||

SWITCH QUEUE PREDICTIVE PROTOCOL (SQPP) BASED PACKET SWITCHING METHOD

RELATED APPLICATION

The present application relates to concurrently filed, U.S. patent application Ser. No. 10/037,291 entitled "Switch Queue Predictive Protocol (SQPP) Based Packet Switching Technique", owned by the assignee of this application and incorporated herein by reference.

FIELD OF THE INVENTION

The present invention is related to an improved packet switching technology. More specifically, the present invention relates to a switch queue predictive protocol (SQPP) based packet switching technology.

RELATED ART

There are several system architectures that can be used to build a packet/cell switching fabric: a shared bus architecture, a shared memory architecture, an output buffered architecture, and cross-point fabric with buffered input/output architecture. Each of these architectures has shortcomings in the applications that are targeted by the present invention.

FIG. 1A illustrates a shared bus architecture, which includes a shared bus 10 and circuit boards 11 having I/O buffers 12. The shared bus architecture cannot practically be scaled to handle bandwidths greater than 5 Gbps when circuit boards 11 are separated by 19-inches or more in a shelf system. The reason is due to the electronic characteristics of the shared bus 10. The shared bus architecture allows multiple circuit boards 11 within a shelf to share the same transmit and receive media. Data is transmitted in a broadcast fashion. Each board 11 must wait its turn before transmitting on the shared bus 10. All boards 11 have the ability to listen to all transmitted data and selectively extract data from the shared bus 10 based on a message or TDM addressing scheme.

FIGS. 1B and 1C are block diagrams illustrating a shared memory architecture and an output buffered architecture, respectively. The shared memory architecture of FIG. 1B includes a plurality of switch ports 21, a central switch fabric 22, and a shared memory 23. The output buffered architecture of FIG. 1C includes a plurality of switch ports 31, each having an output buffer 32, and a central switch fabric 33. The shared memory and output buffered architectures are not easily scaled for two reasons: (1) the memory access speed of shared memory 23 (or output buffers 32), must be as fast as the overall bandwidth of central switch fabric 22 (or central switch fabric 33), and (2) shared memory 23 and output buffers 32 must be very large for packet/cell switching applications. In the case of the shared memory architecture, the switch fabric 22 aggregates data from all of the switch ports 21 (e.g. 8), storing and retrieving the data to/from a single shared memory 23. This has the effect of requiring that the speed of the shared memory 23 is "n" times that of each individual port 21 where "n" is the number of ports on the switch 22. Similarly the size of the memory 23 must be large enough to hold data from all ports 21. Traffic statistics enables the shared memory 23 to be sized somewhat smaller than "n" times the memory required for one port because not all ports 21 transmit equal amounts of data at the same time. However, in applications in which the data traffic has been aggregated to a very high level, the percent of idle time per port becomes less and less significant. The output buffered architecture must deal with these same issues (memory speed and size), since this architecture requires that each output buffer 32 be capable of simultaneously accepting data from all ports.

FIG. 1D is a block diagram illustrating a cross-point fabric with buffered input/output architecture. The cross-point fabric with buffered input/output architecture includes a plurality of line cards 41, each having an input/output (I/O) buffer 42, and a switch card 45, which includes a cross-point switch fabric 43, and an arbiter 44. Compared to these shared memory and output buffered architectures (FIGS. 1B–1C), the cross-point fabric with buffered input/output architecture (FIG. 1D) is much more scalable and flexible. The speed of each I/O buffer 42 is required to match the line card data rate rather than the entire cross-point switch bandwidth. The cross-point fabric with buffered input/output architecture has become very popular in today's high-speed routers and ATM switch products in the range from 20 Gbps to 1 Tbps.

For the cross-point fabric with buffered input/output architecture, a centralized arbiter 44 is usually required to match requests from ingress ports to available egress ports. Without an efficient and fast arbiter, the cross-point architecture with input/output buffer can become blocking. A popular arbitration algorithm is the so-called Virtual Output Queuing with SLIP arbitration algorithm. However, this approach requires centralized arbiter chip 44, and can become difficult to properly support multicast traffic. Depending on the incoming traffic pattern, the throughput of cross-point switch 43 may be limited to less than 100% of its bandwidth.

The I/O buffers 42 having traffic to transmit to cross-point switch fabric 43 transmit requests to centralized arbiter 44. These requests each indicate the desired egress line card for the data. Based on these requests and the availability of the targeted egress switch fabric ports, arbiter 44 decides to grant or deny the requests. According to the given grants, arbiter 44 sets up cross-point switch fabric 43 to connect each ingress port to the desired egress port. After the ingress/egress switch fabric pairs have been connected, the line card I/O (input) buffer 42 transmits traffic through cross-point switch fabric 43 to the destination line card I/O (output) buffer 42 for a prescribed period of time (generally the time period to send one fixed length packet/cell). With very high-speed packet/cell transmission rates, it can be challenging to design an efficient arbitration algorithm that achieves 100% throughput for real life data network traffic.

The traditional cross-point fabric with buffered input/output architecture uses a cut-through technique. The cross-point connection, made between an ingress/egress pair, can be viewed as a wire connection, and each data bit is forwarded as each data bit is received.

Note that the shared memory architecture of FIG. 1B does not need a centralized arbitration function to control ingress traffic access to the central switch fabric 22. All of the incoming traffic is written into the centralized shared memory 23 and then read out as transmission time becomes available on each of the outgoing switch ports 21. If the memory size is large enough, there is no blocking and the switch fabric 22 can operate at 100% of its bandwidth.

The above-described packet switching technologies are further complicated if variable length packets are allowed. Most high-speed packet/cell switching technologies, such as those used in connection with the architectures of FIGS. 1A–1D, require that variable length packets must first be padded into a fixed length internal packet/cells before switching. This padding process can add as much as 30% of transmission overhead to the switched cell/packet. Moreover, the complex arbiter 44 of the traditional cross-point fabric with buffered input/output architecture must be made even more complex to support variable length packets.

It would therefore be desirable to have an improved packet switching technology that overcomes the above-described deficiencies of conventional packet switching technologies. It would further be desirable to have a system that is bandwidth scalable, does not require an overly complex arbiter, utilizes reasonable memory access speeds and uses efficient coding techniques. It would further be desirable if the improved packet switching technology were capable of providing a switch throughput efficiency that is close to that of the shared memory architecture (i.e., 100% of switch bandwidth). It would further be desirable if the improved packet switching technology were capable of reducing the transmission overhead of variable length packets.

SUMMARY

Accordingly, the present invention provides a new packet switching technology based on a Switch Queue Predictive Protocol (SQPP). The SQPP technique uses a cross-point switch fabric with large input and output buffers, and a distributed arbiter (rather than a centralized arbiter).

The advantages of the SQPP system can be summarized as follows. The SQPP system achieves the scalability of the cross-point fabric with buffered input/output architecture. However, the SQPP system does not require a complex centralized arbiter chip. The SQPP system operates as a distributed arbiter that matches the requesting ingress switch ports to available egress switch ports. The proposed SQPP system is able to achieve a switch fabric throughput efficiency that is close to that achieved by the shared memory architecture (i.e., about 100% of the switch fabric bandwidth). Moreover, the SQPP system enables variable length packets to be switched across the switch fabric with a transmission overhead that is reduced to about 10–15%.

In a particular embodiment, the SQPP system includes a switch fabric having a cross-point switch arranged in rows and columns, wherein a cross-point buffer is located at each cross-point of the cross-point switch. Each cross-point buffer includes a plurality of cross-point queues, wherein each of the cross-point queues supports a different quality of service. Each of the cross-point queues includes a relatively small number of entries. For example, each cross-point queue may include 6 entries in one embodiment. The cross-point queue size is designed to provide microseconds of timing relief for packets being routed through the cross-point switch.

The switch fabric further includes a plurality of actual available queue space tables (AAQSTs), each identifying the actual queue space available in a row of the cross-point buffers.

The SQPP system also includes a plurality of line cards, each coupled to the switch fabric, and each having an input buffer, an output buffer, and a predicted available queue space table (PAQST) identifying predicted queue space available in a row of the cross-point buffers.

Each line card includes a line card function for converting an input data packet having a first format into one or more internal frames (iFrames) having a second format. The second format includes a User Switching Tag followed by a data payload. The User Switching Tag is used to transmit the instructions and information required by the SQPP protocol.

Each iFrame has a maximum length L. However shorter iFrames are possible, thereby allowing the SQPP to handle variable length internal frames.

In general, the SQPP system operates as follows. One of the line cards (i.e., a source line card) receives an incoming packet, and in response, transforms the packet into one or more iFrames in the source line card, wherein each iFrame includes a User Switching Tag and corresponding data payload. If the source line card predicts that there is available queue space in the switch fabric (using the corresponding PAQST), then the source line card transmits the iFrames to a cross-point queue of the switch fabric. The iFrames are stored in the cross-point queue. The iFrames are subsequently transmitted from the cross-point queue to a destination line card, under the control of the switch fabric. The destination line card converts the iFrames into output packets. Because the iFrames are temporarily stored in the cross-point queue, the packet switching can be synchronous or asynchronous.

In one embodiment, each line card decrements an entry in its PAQST upon transmitting an iFrame including user data to a cross-point queue. Thus, the predicted available queue space for a cross-point queue is reduced each time an iFrame containing user data is transmitted to the cross-point queue. If the predicted available queue space for a cross-point queue is zero, the line card will not transmit an iFrame to that cross-point queue until after predicted queue space becomes available.

The switch fabric decrements an entry in a corresponding AAQST each time that a received iFrame is stored in a cross-point queue. After the iFrame is transmitted from the cross-point queue to the destination line card, the switch fabric increments the AAQST and transmits an update to the source line card, thereby causing the source line card to increment the corresponding entry in the PAQST.

In accordance with another embodiment, each of the line cards periodically transmits an update request to the switch fabric. In response, the switch fabric transmits the corresponding AAQSTs to the line cards. The PAQST of each line card is then updated using the received AAQST.

The present invention will be more fully understood in view of the following description and drawings.

BRIEF DESCRIPTION OF THE DRAWINGS

FIGS. 5A and 5B are block diagrams illustrating ingress User Switching Tags for uni-cast and multi-cast iFrames, respectively.

FIGS. 6A and 6B are block diagrams illustrating egress User Switching Tags for uni-cast and direct multi-cast egress User iFrames, respectively.

FIG. 8A is a block diagram illustrating an egress Control iFrame, which is used to implement an $AAQST_j$ Update in accordance with one embodiment of the present invention.

DETAILED DESCRIPTION

Figure 2:
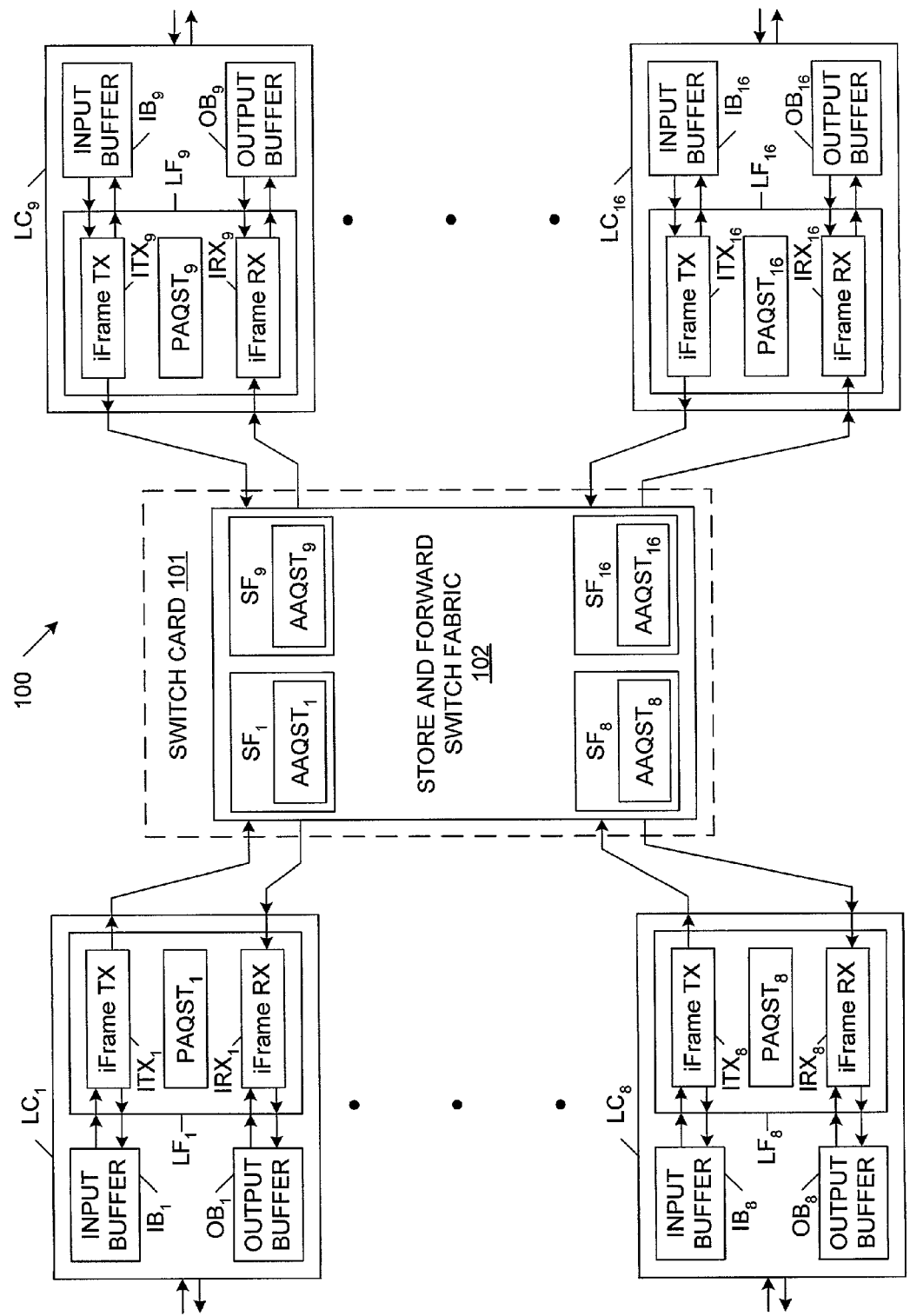
FIG. 2 is a block diagram illustrating a Switch Queue Predictive Protocol (SQPP) architecture in accordance with one embodiment of the present invention.

FIG. 2 is a block diagram illustrating a Switch Queue Predictive Protocol (SQPP) architecture 100 in accordance with one embodiment of the present invention. SQPP architecture 100 includes a switch card 101 having a store-and-forward switch fabric 102, and a plurality of line cards $LC_1$–$LC_{16}$. Line cards $LC_2$–$LC_7$ and $LC_{10}$–$LC_{15}$ are not illustrated for purposes of clarity. However, these line cards are connected in the same manner as illustrated line cards $LC_1$, $LC_8$, $LC_9$ and $LC_{16}$. Although sixteen line cards are described in the present embodiment, it is understood that other numbers of line cards can be used in other embodiments. Each line card $LC_N$ includes an input buffer $IB_N$, an output buffer $OB_N$, and a line card function block $LF_N$, where N includes the integers between 1 and 16, inclusive. Thus, line card $LC_1$ includes input buffer $IB_1$, output buffer $OB_1$ and line card function block $LF_1$. Each line card function $LF_N$ includes an internal frame transmitter $ITX_N$, an internal frame receiver $IRX_N$ and a predicted available queue space table $PAQST_N$. Store-and-forward cross-point switch fabric 102 includes a cross-point switch and a plurality of switching function blocks $SF_1$–$SF_{16}$. Each switching function block $SF_N$ includes a corresponding actual available queue space table $AAQST_N$. Each of the switching function blocks $SF_1$–$SF_6$ is coupled to a corresponding one of line card function blocks $LF_1$–$LF_{16}$. As described in more detail below, switch fabric 102 and input buffers $IB_1$–$IB_{16}$ are enhanced by the line card function blocks $LF_1$–$LF_{16}$ and the switching function blocks $SF_1$–$SF_{16}$, thereby enabling switch fabric 102 and input buffers $IB_1$–$IB_{16}$ to communicate with each other. As a result, the input buffers $IB_1$–$IB_{16}$ are enabled to automatically regulate the amount of traffic that is sent to switch fabric 102. In other words, the SQPP arbitration is performed in a distributed manner, so that multiple (distributed) less complex arbiters can be used. These distributed arbiters enable scaling to higher bandwidths.

Figure 1A:
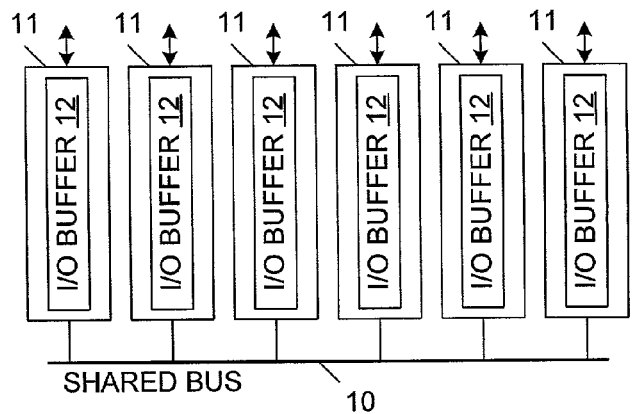
FIG. 1A is a block diagram illustrating a conventional shared bus architecture.
Figure 1B:
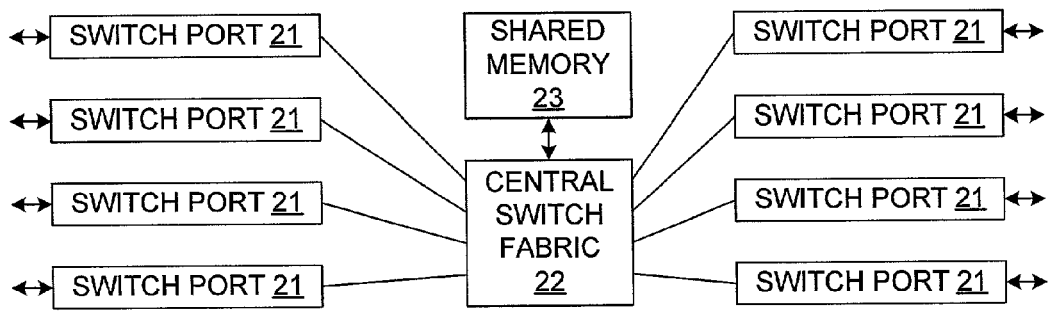
FIGS. 1B and 1C are block diagrams illustrating a conventional shared memory architecture and a conventional output buffered architecture, respectively.
Figure 1C:
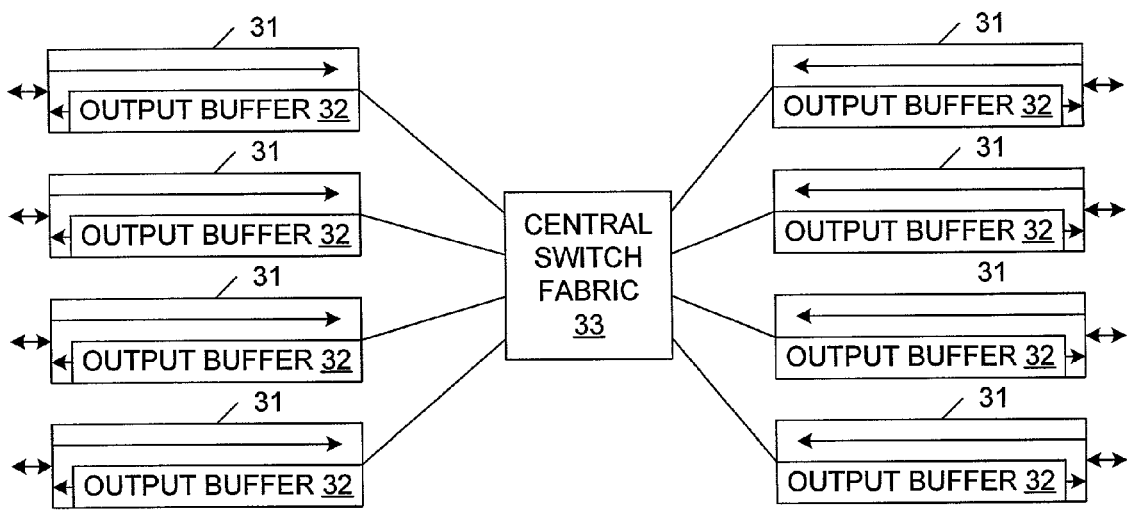
Figure 1D:
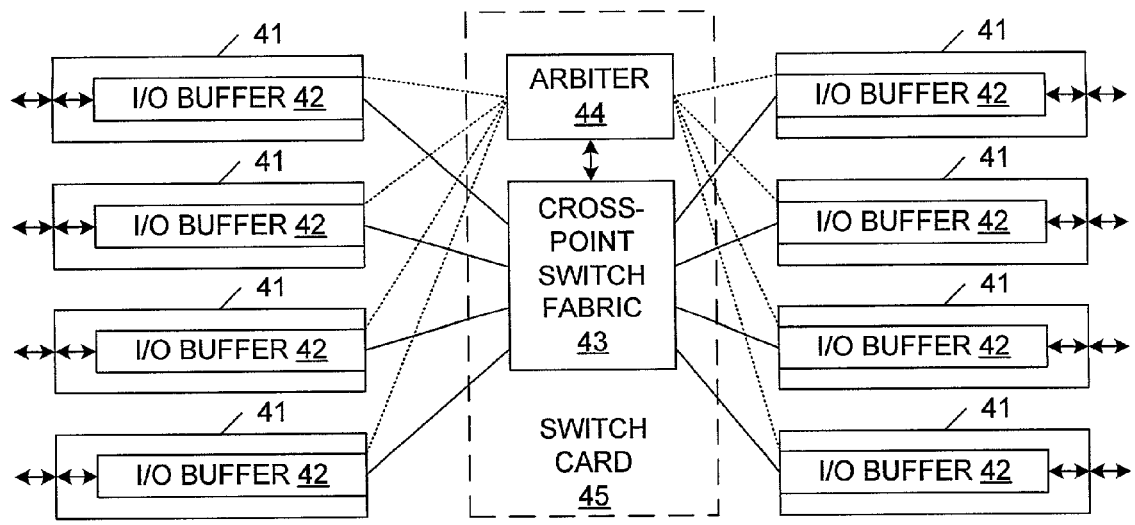
FIG. 1D is a block diagram illustrating a conventional cross-point fabric with buffered input/output architecture.

In contrast to the cut-through technique of the cross-point fabric with buffered input/output architecture (FIG. 1D), the SQPP architecture 100 uses a store-and-forward technique in which a complete datagram must be received before the internal frame is forwarded. The SQPP architecture 100 uses this store-and-forward technique to allow the ingress ports to operate asynchronously from the egress ports. Asynchronous operation makes it easy to switch variable length packets through the switch fabric. Variable length packet switching, as compared to fixed length packet switching (e.g. 53 byte), can reduce the switch port transmission rate significantly since the packet padding can add as much as 30% to the overhead.

When other forms of switching overhead are considered, some existing technologies must speed up the switch fabric by 30–60% to compensate for the internal switch overhead. As the required speed of the switch fabric is increased, power dissipation is increased, and the switch fabric becomes less efficient because more switching bandwidth must be used to switch the overhead data. It is therefore essential to reduce the internal switching overhead. As described in more detail below, the SQPP architecture 100 only requires an overhead of approximately 10–15%.

Figure 3:
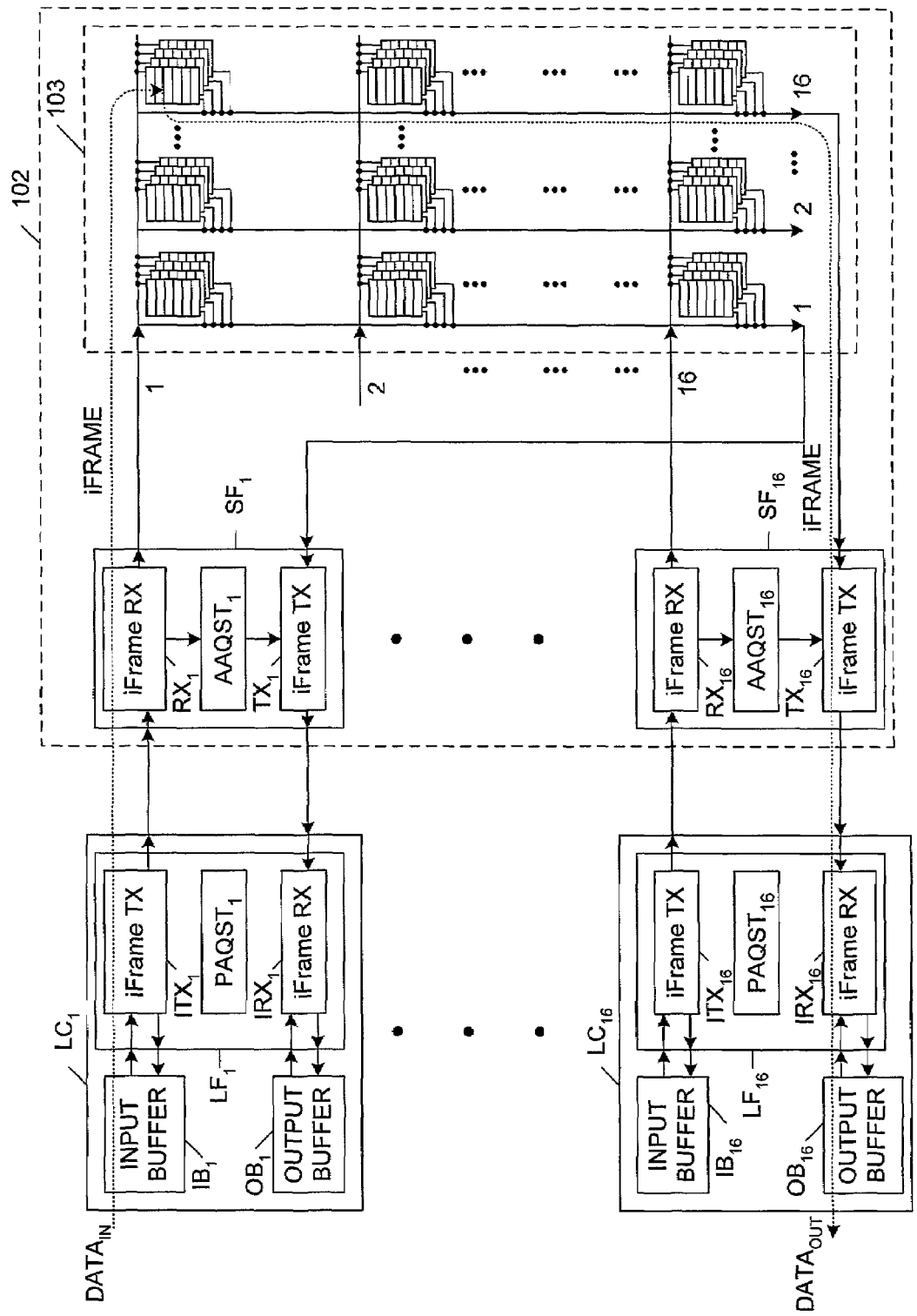
FIG. 3 is a block diagram illustrating portions of the SQPP architecture of FIG. 2 in more detail.

FIG. 3 is a block diagram illustrating portions of SQPP architecture 100 in more detail. In the example shown by FIG. 3, line card $LC_1$ receives user data ($DATA_{IN}$) from an external source. Line card function $LF_1$ translates the user data into datagrams, which are referred to as internal frames (or iFrames). In the described embodiment, iFrames can vary in size from 7 octets to 134 octets. The iFrame protocol is described in more detail below.

The iFrames are queued in the input buffer $IB_1$. The input buffer $IB_1$ can be large or small to support a large or small burst of data for a large or small number of connections. The size of the input buffer is determined by the traffic requirements of each application.

The iFrames are routed from the input buffer $IB_1$ under the control of line card function $LF_1$. More specifically, these iFrames are routed through iFrame transmitter $ITX_1$ to a corresponding iFrame receiver $RX_1$ in switch function block $SF_1$. Within switch card 101, iFrame receiver $RX_1$ transmits the iFrames to cross-point switch 103.

As described above, the line card function $LF_1$ buffers and exchanges iFrames to and from the switch fabric 102. It is also possible to move the line card function LFto the switch card 101. However, this is a less common method of implementation. If implemented in this way, then the line card function $LF_1$ could instead be viewed as a SQPP switch fabric port gating function. If the line card function $LF_1$ is located on the switch card 101, the input buffer $IB_1$ could be implemented on the line card $LC_1$ or on the switch card 101.

As seen in FIG. 3, switch fabric 102 includes cross-point switch 103. At each cross-point, there is a buffer (hereinafter referred to as a cross-point buffer). Each cross-point buffer includes four queues (hereinafter referred to as cross-point queues), one for each of four quality-of-service (QoS) classes implemented in the present embodiment. Although the present embodiment uses four QoS classes, it is understood that other numbers of QoS classes can be used in other embodiments. Each cross-point queue is configured to store up to 6 iFrames. In other embodiments, each cross-point queue can have another size. The size of the cross-point queue is not related to the traffic requirements of the application, but is instead designed to provide some microseconds of timing relief so that the SQPP protocol can be more easily realized and to achieve maximum throughput.

The switch fabric's cross-point memory size can be calculated by saying that $Q_{jkq}$ denotes the cross-point queue for the $j^{th}$ ingress switch port and $k^{th}$ egress switch port with $q^{th}$ QoS class. Each cross-point queue can store up to M iFrames with length L (in octets). Therefore we can say that $Q_{jkq}=M*L$ (octets); j=1, ..., N; k=1, ..., N; q=1, ..., H. The total memory required, then, is $H*M*L*N^2$ (octets). Even though the cross-point queue size, M, could be any number, a small number, such as 6, may be sufficient. Although FIG. 3 illustrates the cross-point queues as being $N^2$ independent buffers, there are also other methods to organize the buffers. For example, one centralized buffer block could be used as long as it is partitioned into $N^2$ logically independent blocks.

In the described embodiment, switch card 101 maintains a table of the actual available queue space in the cross-point queues of switch fabric 102. This table is hereinafter referred to as an Actual Available Queue Space Table (AAQST). In the described embodiment, the AAQST is comprised of 16 smaller $AAQST_j$ tables, one for each of line cards $LC_1$–$LC_{16}$, (where j varies from 1 to 16). In this embodiment, switch function blocks $SF_1$–$SF_6$ maintain $AAQST_1$–$AAQST_{16}$, respectively. Each of $AAQST_1$–$AAQST_{16}$ identifies the actual available queue space in a corresponding row of cross-point switch 103.

The entries of the AAQST table are maintained by switch fabric 102, and can be identified as actual queue spaces $AQS_{jkq}$, where j identifies the ingress switch port (j=1 to 16), k identifies the egress switch port (k=1 to 16), and q identifies the QoS class (q=1 to 4). For the, $j^{th}$ line card, the AAQST table $AAQST_j$ is defined as follows.

TABLE 1

ENTRIES IN $AAQST_j$

| | | | |
|---|---|---|---|
| $AQS_{j,1,1}$ | $AQS_{j,1,2}$ | $AQS_{j,1,3}$ | $AQS_{j,1,4}$ |
| $AQS_{j,2,1}$ | $AQS_{j,2,2}$ | $AQS_{j,2,3}$ | $AQS_{j,2,4}$ |
| $AQS_{j,3,1}$ | $AQS_{j,3,2}$ | $AQS_{j,3,3}$ | $AQS_{j,3,4}$ |
| $AQS_{j,4,1}$ | $AQS_{j,4,2}$ | $AQS_{j,4,3}$ | $AQS_{j,4,4}$ |
| ... | ... | ... | ... |
| $AQS_{j,14,1}$ | $AQS_{j,14,2}$ | $AQS_{j,14,3}$ | $AQS_{j,14,4}$ |
| $AQS_{j,15,1}$ | $AQS_{j,15,2}$ | $AQS_{j,15,3}$ | $AQS_{j,15,4}$ |
| $AQS_{j,16,1}$ | $AQS_{j,16,2}$ | $AQS_{j,16,3}$ | $AQS_{j,16,4}$ |

Each of line cards $LC_1$–$LC_{16}$ maintains a table of the predicted available queue space of the associated cross-point queues in switch fabric 102. Each of these tables is hereinafter referred to as a Predicted Available Queue Space Table (PAQST). In this embodiment, line cards $LC_1$–$LC_{16}$ (and more specifically, line card functions $LF_1$–$LF_{16}$) maintain $PAQST_1$–$PAQST_{16}$, respectively. Each of $PAQST_1$–$PAQST_{16}$ identifies the predicted available queue space in a corresponding row of cross-point switch 102.

The entries of the PAQST table are maintained by line cards $LC_1$–$LC_{16}$, respectively, and can be identified as predictive queue spaces $PQS_{jkq}$, where j identifies the ingress switch port (j=1 to 16), k identifies the egress switch port (k=1 to 16), and q identifies the QoS class (q=1 to 4). For the, $j^{th}$ line card, the PAQST table $PAQST_j$ is defined as follows.

TABLE 2

ENTRIES IN $PAQST_j$

| | | | |
|---|---|---|---|
| $PQS_{j,1,1}$ | $PQS_{j,1,2}$ | $PQS_{j,1,3}$ | $PQS_{j,1,4}$ |
| $PQS_{j,2,1}$ | $PQS_{j,2,2}$ | $PQS_{j,2,3}$ | $PQS_{j,2,4}$ |
| $PQS_{j,3,1}$ | $PQS_{j,3,2}$ | $PQS_{j,3,3}$ | $PQS_{j,3,4}$ |
| $PQS_{j,4,1}$ | $PQS_{j,4,2}$ | $PQS_{j,4,3}$ | $PQS_{j,4,4}$ |
| ... | ... | ... | ... |
| $PQS_{j,14,1}$ | $PQS_{j,14,2}$ | $PQS_{j,14,3}$ | $PQS_{j,14,4}$ |
| $PQS_{j,15,1}$ | $PQS_{j,15,2}$ | $PQS_{j,15,3}$ | $PQS_{j,15,4}$ |
| $PQS_{j,16,1}$ | $PQS_{j,16,2}$ | $PQS_{j,16,3}$ | $PQS_{j,16,4}$ |

When SQPP architecture 100 is initialized (i.e., before any iFrames are transmitted), each $PQS_{jkq}$ entry in the PAQST is set with a starting queue size that indicates how many iFrames the switch fabric cross-point queues can hold. In the present example, each $PQS_{jkq}$ entry is originally set to 6 (corresponding with 6 iFrames). At this time, the cross-point queues in switch fabric 102 are all empty (cleared), such that all entries in the cross-point fabric are available. Similarly, each $AQS_{jkq}$ entry in the AAQST is set a starting queue size representative of the capacity of each cross-point queue (e.g., 6).

Line card $LC_j$ is allowed to send user data to the $k^{th}$ egress switch port with the $q^{th}$ QoS class if and only if the predicted available queue space $PQS_{jkq}$ is not zero. When line card $LC_j$ sends an iFrame to the kth egress switch port of switch fabric 102, the line card $LC_j$ decrements the corresponding $PQS^{jkq}$ value by one. When switch fabric 102 receives the iFrame, this switch fabric 102 decrements the corresponding $AQS_{jkq}$ value by 1. When the switch fabric 102 forwards/transmits the iFrame to the $k^{th}$ egress switch port, the $AQS_{jkq}$ value is incremented by 1 and the switch fabric 102 sends a PQS Update message to the originating line card $LC_j$ to indicate that the iFrame has been forwarded. When the line card $LC_j$ receives the PQS Update, the line card $LC_j$ increments the $PQS_{jkq}$ value by 1.

The goal of the SQPP is to keep $PQS_{jkq}=AQS_{jkq}$ all the time. However, for various reasons such as iFrames being lost or corrupted and because of timing delays between the switch fabric 102 and line cards $LC_1$–$LC_{16}$, each $AQS_{jkq}$ and $PQS_{jkq}$ value can become different. Therefore specialized SQPP procedures are needed to periodically re-synchronize them.

Thus, the SQPP architecture 100 is designed to enable each of line cards $LC_1$–$LC_{16}$ to predict whether there is available space in the cross-point queues of switch fabric 102. An iFrame can be transmitted from line cards $LC_1$–$LC_6$ to switch fabric 102 only if available cross-point queue space is predicted within switch fabric 102. The accuracy of the prediction depends on the ability of switch fabric 102 to find sufficient transmission time to update line cards $LC_1$–$LC_{16}$ with the latest queue space information. The queue space information stored by line cards $LC_1$–$LC_{16}$ is commonly out of sync with the queue space information stored by switch fabric 102, due to the time delay for formulating, transmitting and interpreting the SQPP messages.

After passing through the switch fabric, the iFrames are queued in the output buffer of the destination line card. Each output buffer is sized similar to that of the input buffers (according to the assigned traffic). The input and output buffers provide storage for congestion conditions when the volume of incoming traffic exceeds the capacity of the system to forward that traffic (e.g., a momentary input burst at 50 Gb/s must be buffered to pass through a 40 Gb/s switch).

SQPP Protocol

The SQPP protocol will now be described in more detail. The SQPP protocol is comprised of three identities: (1) an iFrame definition, (2) an SQPP line card function that adds/removes the SQPP information to/from the user data stream, and (3) an SQPP switching function that passes SQPP iFrames between two line cards.

iFrame Definition

An internal frame, or "iFrame" is a variable length cell/packet used to exchange data between line cards $LC_1$–$LC_{16}$ and switch fabric 102. There are two iFrame formats that are used, namely, the User iFrame and the Control iFrame. The User iFrame is used to carry user data and generalized SQPP control information. The Control iFrame is used to carry specialized SQPP control information without user data. The User iFrames and Control iFrames are described in more detail below.

User iFrame Formats

A User iFrame is composed of a User Switching Tag and user payload data. There is a maximum length, L, defined for User iFrames, where L is a number of octets. In the described embodiments, L is equal to 134 octets.

Figure 4:
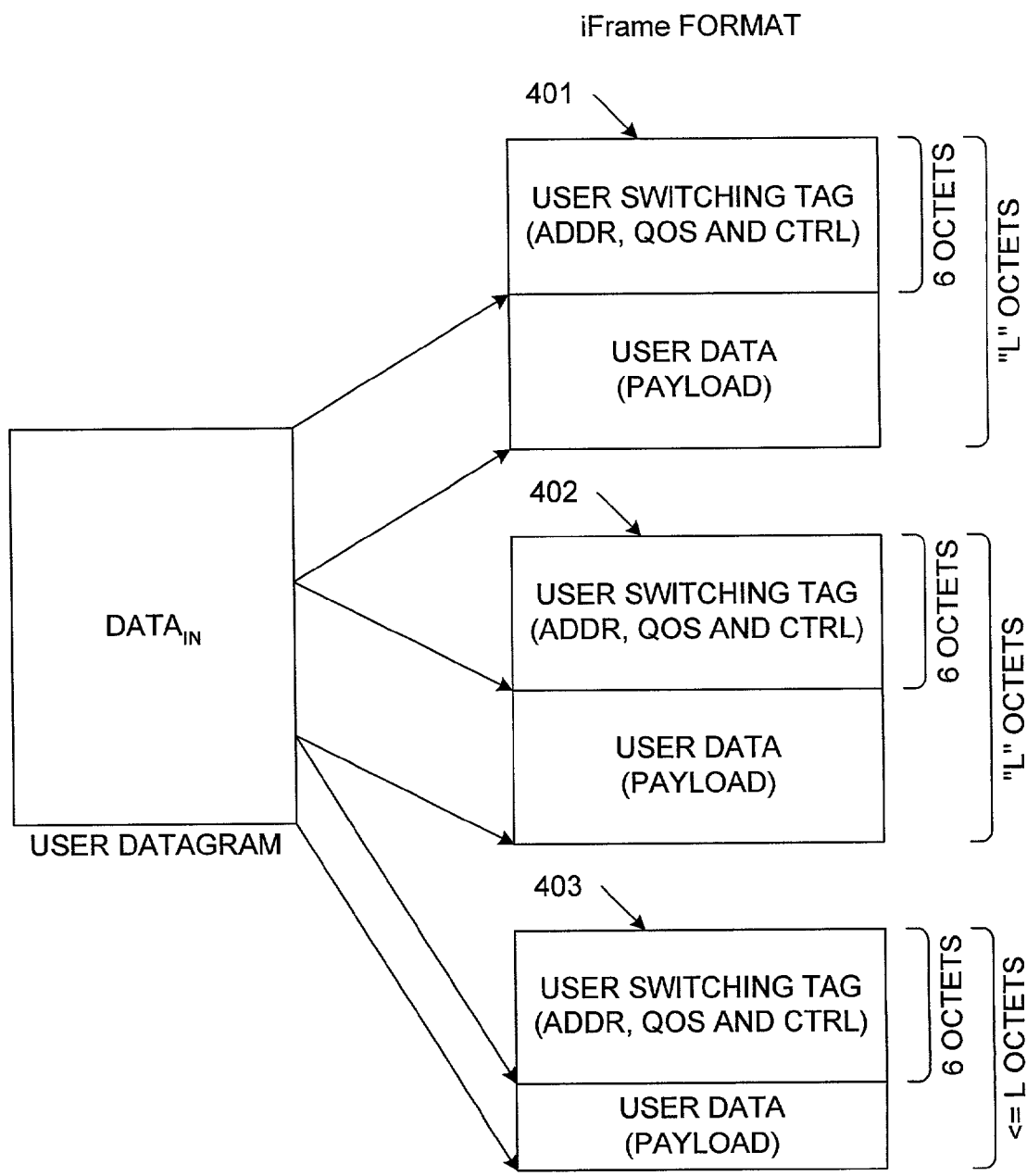
FIG. 4 is a block diagram illustrating the manner in which a received user datagram ($DATA_{IN}$) is formatted into User iFrames.

FIG. 4 is a block diagram illustrating the manner in which a received user datagram ($DATA_{IN}$) is formatted into User iFrames 401–403. Received user datagrams, such as $DATA_{IN}$, that are longer than (L–6) octets must be segmented into a sequence of iFrames. Each iFrame in the sequence is L in length except the last iFrame 403 of the sequence that has a length greater than six octets and less than or equal to L octets. The received user datagram $DATA_{IN}$ is divided into three User iFrames 401–403. Each of the User iFrames includes a User Switching Tag having a length of 6 octets, followed by a portion of the user datagram $DATA_{IN}$, which is added to the User iFrame as user data (payload).

Note that the User Switching Tag will typically include a seventh octet, which is a packet delineation byte, which is not discussed in the disclosure. Assuming that 64-byte packets are encapsulated in 71 byte User iFrames (i.e., L=71), then the overhead is equal to (71–64)/71, or about 10%. Assuming that 40-byte packets are encapsulated in 47 byte User iFrames, then the overhead is equal to (47–40)/47, or about 15%.

Ingress User iFrame Formats

FIGS. 5A and 5B are block diagrams illustrating ingress User Switching Tags 501A and 501B for uni-cast and multi-cast iFrames, respectively. User Switching Tags for the ingress direction differ from User Switching Tags for the egress direction. The first six bits of each ingress User Switching Tag 501A–501B are defined as follows. The first two bits C1/C2 are used to identify the iFrame command type. In the ingress direction (from line card $LC_j$ to switch fabric 102) the line card $LC_j$ sets the C1 and C2 bits to identify the iFrame command type as defined in Table 3.

TABLE 3

Ingress iFrame Command Types

| C1 | C2 | Action |
| --- | --- | --- |
| 0 | 0 | User iFrame with no command action |
| 1 | 0 | User iFrame with request for $AAQST_j$ |
| 0 | 1 | Reserved |
| 1 | 1 | Control iFrame |

Thus, an ingress User iFrame will include a request for updating the $AAQST_j$ table, if the C1/C2 value is equal to "10". Note that the 'j' in the $AAQST_j$ request is implicitly understood because there is one AAQST table corresponding with each switch fabric port. The switch fabric 102 only sends an $AAQST_j$ table to the corresponding port j. For example, the switch fabric 102 will only send the $AAQST_3$ table to port 3 (connected to line card $LC_3$). An AAQST request from line card $LC_{15}$ (on port 15) will result in the switch fabric sending $AAQST_{15}$ to port 15. This mapping function is hardwired.

The third bit (M) of each ingress User Switching Tag 501A–501B is used to indicate whether the User iFrame is a uni-cast iFrame (M=0) or a multi-cast iFrame (M=1). Thus, M=0 in ingress User Switching Tag 501A, and M=1 in ingress User Switching Tag 501B. A uni-cast iFrame is sent to a single egress switch port, and a multi-cast iFrame is transmitted to a plurality of egress switch ports.

The fourth bit (E) of each ingress User Switching Tag 501A–501B is used to indicate whether the corresponding User iFrame uses an extended version of the iFrame protocol (E=1) or the standard version of the iFrame protocol (E=0). In the described embodiment, E=0, such that the standard iFrame protocol is implemented. However, this bit allows the SQPP to be extended to support more information in the future.

The fifth and sixth bits (F and L) of each ingress User Switching Tag are used to indicate the sequence type of the User iFrame (e.g., first, last, middle, only). The F and L sequence type bits are encoded according to Table 4.

TABLE 4

F/L Sequence Type Encoding

| F | L | Meaning |
| --- | --- | --- |
| 0 | 0 | "Mid" User iFrame of a longer packet (neither first nor last) |
| 1 | 0 | First User iFrame of a longer user datagram |
| 0 | 1 | Last User iFrame of a longer user datagram |
| 1 | 1 | Only User iFrame associated with a user datagram (first and last) |

Thus, the User Switching Tags of iFrames 401, 402 and 403 (FIG. 4) will have F/L values of "10", "00" and "01" respectively.

Each of ingress User Switching Tags 501A–501B also includes 32-bits of addressing information associated with the corresponding user data payload. This addressing information is used by switch fabric 102 and the destination line card $LC_k$. For uni-cast User iFrames (M=0), the first 10-bits of this addressing information are used by the switch fabric 102 to steer the iFrame to the proper switch fabric egress port. These 10-bits are composed of a 2-bit egress port QoS class ID and an 8-bit switch fabric egress port ID. Because there are only 16 switch fabric egress ports in the described example, only 4 of these 8-bits are required in the present example. The next 22-bits (8-bits+8-bits+6-bits) are used to identify the Flow ID (FLID) of the ingress User iFrame. Switch fabric 102 does not directly use the FLID, except that the switch fabric stores the FLID for re-transmission in the egress direction.

At the end of the FLID field, there are 2-bits that are unused/reserved for future use, followed by eight bits that are used for transmission error checking (TEC). The 8-bit TEC may be composed of an 8-bit CRC or parity code (hereinafter referred to as the CRC). If additional protection is preferred, the 2 unused bits can be used to expand the error protection to a 10-bit CRC. The CRC field of a User iFrame only protects the ingress User switching Tag (not the appended user data).

Multi-cast User iFrames can be supported using one of two methods. The first multi-cast method uses a direct multi-cast addressing technique and is applicable for systems with 16 or fewer ports. The direct multi-cast addressing technique uses the first 18 bits of the address information. The first 2-bits indicate the egress port quality of service. The remaining 16 bits of direct multi-cast addressing are used as a bit map to indicate which egress ports are to receive the User iFrame. The first bit of the 16-bits is used as an indication for the first port, and so on up to the sixteenth bit, which is used as an indication for the sixteenth port. A bit is set to a "1" value if the corresponding port is to receive the User iFrame. Conversely, a bit is reset to a "0" value if the corresponding port is not to receive the User iFrame.

The second multi-cast method enables the switch fabric to support more than 16 ports using an indirect multi-cast addressing technique. The indirect addressing technique requires the use of a look-up table, which can be implemented with an SRAM block of memory (indicated at the top of FIG. 10). Systems that only require 16 or fewer ports do not require the SRAM block and can be more efficiently implemented using the direct multi-cast addressing technique described above. The indirect multi-cast addressing technique uses the first 2 bits and the last 14 bits of the address information. The first 2 bits indicate the egress port quality of service. The last 14 bits indicate the multicast ID (MCID), and are used as an address that is applied to the SRAM. The data that is retrieved from the SRAM at the specified 14-bit address provides a bit mapped word to indicate which egress ports are to receive the User iFrame. Each bit position within the retrieved word indicates whether the User iFrame is to be sent to the port corresponding to the bit position. For example, a "1" value in the $32^{nd}$ bit position may be used to indicate whether the User iFrame is to be sent to the $32^{nd}$ port. The width of the SRAM word is set appropriately to support the number of ports supported by the system.

At the end of the MCID field, there are 2-bits that are unused/reserved for future use, followed by eight bits that are used for error checking (an 8-bit CRC or parity code). Again, the CRC only protects the ingress User Switching Tag (not the appended user data).

Egress User iFrame Formats

In the egress direction, the switch fabric 102 modifies portions of the ingress User Switching Tag before re-transmitting the iFrame out an egress switching port. FIGS. 6A and 6B illustrate egress User Switching Tags 601A and 601B for uni-cast egress User iFrames and direct multi-cast egress User iFrames, respectively.

The first six bits of each Egress User Switching Tag are defined as follows. The first two bits C1/C2 are used to identify the iFrame command type. The next four bits M/E/F/L have the same functions described above in the ingress User iFrame section.

In the egress direction (from switch fabric 102 to destination line card $LC_k$), the switch fabric 102 sets the C1 and C2 bits to identify a command type as coded in Table 5.

TABLE 5

Egress iFrame Command Types

| C1 | C2 | Action |
|----|----|--------|
| 0 | 0 | User iFrame with no command action |
| 1 | 0 | User iFrame with PQS Update |
| 0 | 1 | Reserved |
| 1 | 1 | Control iFrame |

Thus, an egress User iFrame will include a PQS Update, if the C1/C2 value is equal to "10". In this case, the last two bits of the first octet represent a 2-bit PQS Update QoS value, which identifies the QoS class associated with the PQS Update. The next 8-bits provide an 8-bit PQS Update ID to identify the cross-point buffer for which the Update is being sent. The PQS Update implicitly causes the associated PQS entry to be incremented by a count of one.

If the C1/C2 value is equal to "00", then the 2-bit PQS Update QoS and 8-bit PQS Update ID are not used, and are set to 0 values.

For uni-cast egress User iFrames (M=0), the 22-bit FLID field is unchanged from the ingress uni-cast User iFrame. The next 2-bits are unused/reserved, and are set to zero values. A new error correction code (CRC) is generated and appended to the end of the egress User Switching Tag.

For multi-cast egress User iFrames (M=1), the first 8-bits of the FLID field (i.e., the eight remaining bits from the direct multi-cast egress switch port IDs) become unused/reserved and are set to 0. The 14-bit multi-cast ID (MCID) field is unchanged from the multi-cast ingress User iFrame. The next 2-bits are unused/reserved, and are set to zero values. A new error correction code (CRC) is generated and appended to the end of the egress User Switching Tag.

Ingress Control iFrames

Control iFrames are only used to carry SQPP control information. Thus, there is no user data (payload) associated with a Control iFrame.

An ingress Control iFrame can be used to implement the following functions: (1) an AAQST Update Request, or (2) a Cross-point Queue Purge.

Figure 7A:
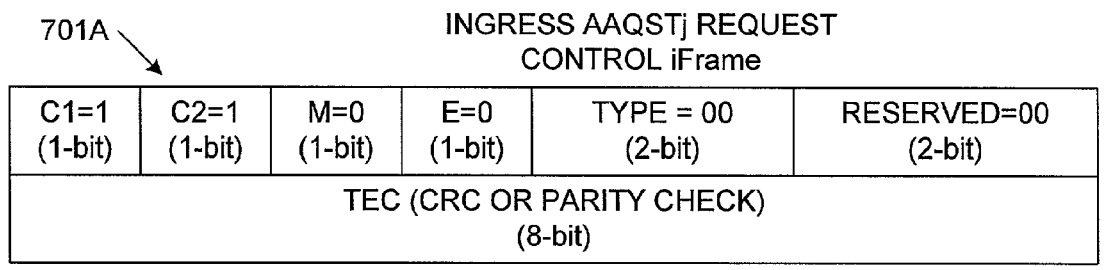
FIG. 7A is a block diagram illustrating an ingress Control iFrame, which is used to implement an $AAQST_j$ Update Request in accordance with one embodiment of the present invention.

FIG. 7A is a block diagram illustrating an ingress Control iFrame 701A, which is used to implement an $AAQST_j$ Update Request in accordance with one embodiment of the present invention. In general, ingress $AAQSTj$ Request Control iFrame 701A is transmitted from one of the line cards $LC_j$ to switch fabric 102. In response, switch fabric 102 retrieves the actual available queue space table ($AAQST_j$) associated with this line card $LC_j$. Switch fabric 102 then transmits this table ($AAQST_j$) back to the line card $LC_j$ (using an egress $AAQST_j$ Update Control iFrame described below), such that the line card $LC_j$ can update its predicted available queue space table ($PAQST_j$).

As described above in Tables 3 and 5, Control iFrames are identified when the C1/C2 bits of the iFrame have a "11" value. Thus, ingress Control iFrame 701A includes C1/C2 bits having a "11" value. The M and E bits of ingress Control iFrame 701A are both set to "0" values.

The fifth and sixth bits of the first octet of an ingress Control iFrame defines the ingress Control iFrame Type. Table 6 defines the "Type" coding for ingress Control iFrames.

TABLE 6

Ingress Control iFrame Type Coding

| Type | Action |
|------|--------|
| 00 | $AAQST_j$ Request Control iFrame |
| 01 | Purge Control iFrame |
| 10 | Reserved |
| 11 | Reserved |

Thus, the $5^{th}$ and $6^{th}$ bits of ingress $AAQST_j$ Request Control iFrame 701A have a value of "00".

The last two bits of the first octet in ingress $AAQST_j$ Request Control iFrame 701A are reserved for future use, and have a value of "00".

An error correction code (CRC) is added to the end of each ingress Control iFrame (including ingress Control iFrame 701A) to protect the entire ingress Control iFrame.

Figure 7B:
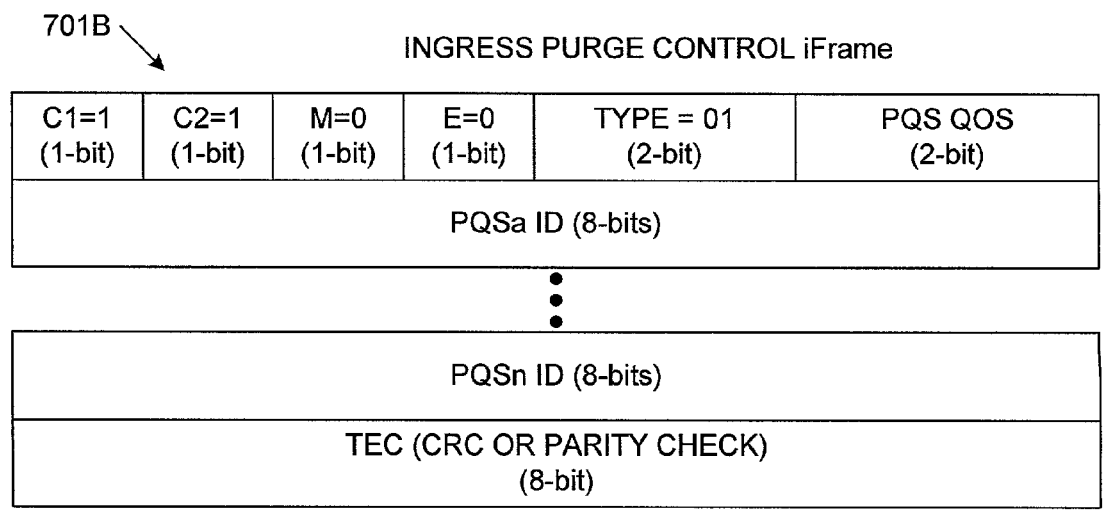
FIG. 7B is a block diagram illustrating an ingress Control iFrame, which is used to implement a Cross-point Queue Purge Request in accordance with one embodiment of the present invention.

FIG. 7B is a block diagram illustrating an ingress Control iFrame 701B, which is used to implement a Cross-point Queue Purge Request in accordance with one embodiment of the present invention. In general, ingress Purge Control iFrame 701B is transmitted from one of the line cards $LC_j$ to switch fabric 102. The ingress Purge Control iFrame 701B provides the addresses of selected cross-point queues within switch fabric 102. In response, switch fabric 102 resets the contents of the addressed cross-point queues and forces the AQS counts for the addressed cross-point queues to their maximum value (e.g., 6), as though the cross-point queues are empty. At the same time, the line card $LC_j$ forces its associated PQS counts in its predicted available queue space table ($PAQST_j$) to their maximum value (e.g., 6), thereby providing consistency between switch fabric 102 and line card $LC_j$.

The C1/C2 bits of ingress Control iFrame 701B have a "11" value (consistent with Table 3 above), thereby identifying iFrame 701B as a Control iFrame. The M and E bits of ingress Control iFrame 701B are both set to "0" values.

The fifth and sixth bits of ingress Purge Control iFrame 701B have a value of "01", consistent with "Type" coding set forth in Table 6 above.

The last two bits of the first octet in ingress Purge Control iFrame 701B identify the QoS class associated with the Cross-point Queue Purge.

An error correction code (CRC) is added to the end of ingress Purge Control iFrame 701B to protect the entire ingress Control iFrame.

Egress Control iFrames

An egress Control iFrame can be used to implement the following functions: (1) an actual available queue space table (AAQST) Update, or (2) a predicted available queue space table (PAQST) Control Update [PQS Control Update].

FIG. 8A is a block diagram illustrating an egress Control iFrame 801A, which is used to implement an $AAQST_j$ Update in accordance with one embodiment of the present invention. In general, egress AAQSTj Update Control iFrame 801A is transmitted from switch fabric 102 to one of the line cards $LC_j$ (in response to an ingress AAQSTj Request Control iFrame 701A). The egress Control iFrame 801A includes a payload that includes the actual queue space values ($AQS_{jkq}$) of the $AAQST_j$ table.

As described above in Tables 3 and 5, Control iFrames are identified when the C1/C2 bits of the iFrame have a "11" value. Thus, egress Control iFrame 801A includes C1/C2 bits having a "11" value. The M and E bits of egress Control iFrame 801A are both set to "0" values.

The fifth and sixth bits of the first octet of an egress Control iFrame are set to a value of "00". The last two bits of the first octet define the egress Control iFrame Type. Table 7 defines the "Type" coding for egress Control iFrames.

TABLE 7

Egress Control iFrame Type Coding

| Type | Action |
| --- | --- |
| 00 | $AAQST_j$ Update Control iFrame |
| 01 | Future specialized Control iFrame |
| 10 | PQS Control iFrame |
| 11 | Reserved |

Thus, the last two bits of the first octet of egress $AAQST_j$ Update Control iFrame 801A have a value of "00".

In the described embodiment, the following octets include 4-bit update increments for each of the actual queue space values $AQS_{jkq}$, where j indicates the ingress port, k indicates the egress port and q indicates the QoS. These AQS values are used to update the predicted available queue space table (PAQST) in the line card $LC_j$.

An error correction code (CRC) is added to the end of each egress Control iFrame (including egress AAQST Update Control iFrame 801A) to protect the entire egress Control iFrame.

Figure 8B:
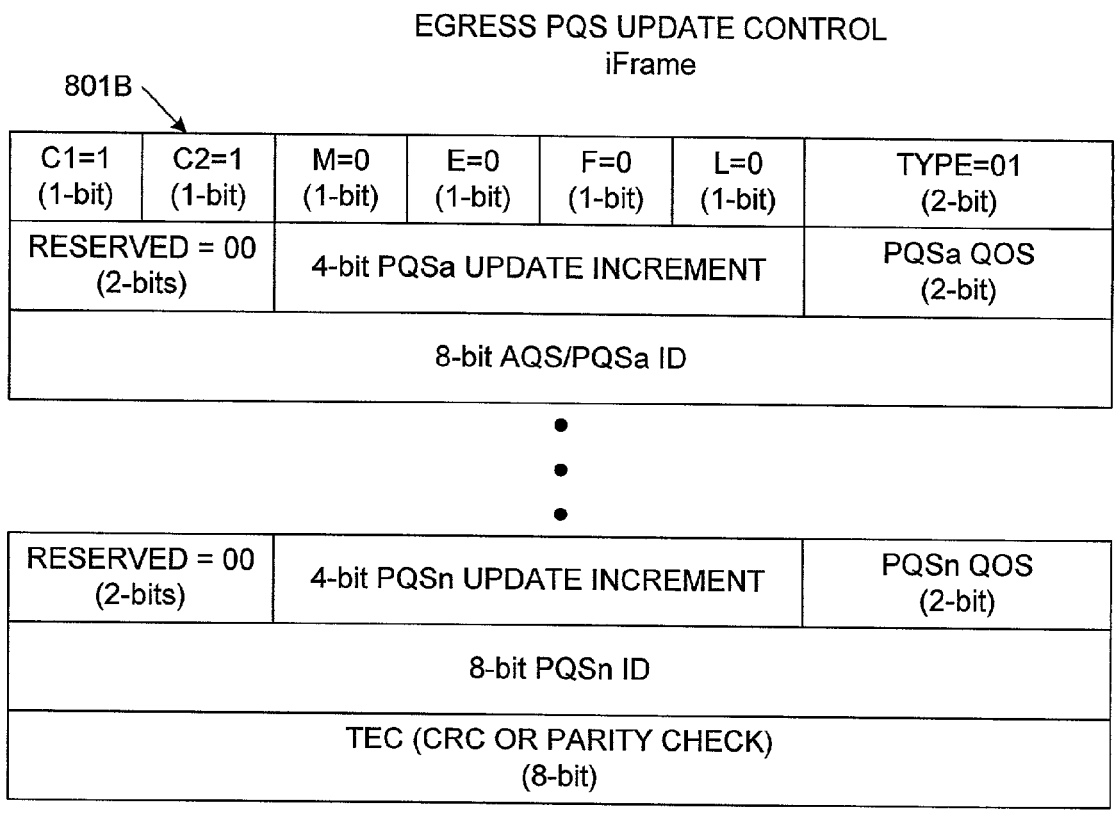
FIG. 8B is a block diagram illustrating an egress Control iFrame, which is used to implement a predicted queue space (PQS) update in accordance with one embodiment of the present invention.

FIG. 8B is a block diagram illustrating an egress Control iFrame 801B, which is used to implement a predicted queue space (PQS) control update in accordance with one embodiment of the present invention. In general, egress PQS Update Control iFrame 801B is transmitted from switch fabric 102 to one of line cards $LC_j$ (after switch fabric 102 transmits one or more associated data values from a cross point queue to a $k^{th}$ egress port). The egress PQS Update Control iFrame 801B provides one or more predictive queue space update increments, as well as their corresponding locations within the predicted available queue space table $PAQST_j$. In response, line card $LC_j$ updates the $PAQST_j$ table, thereby keeping the line card $PAQST_j$ table in near synchronism with that of the switch fabric AAQST. Note that in the time that it takes for the switch fabric to send the PQS Control Update, the line card may have sent one or more iFrames, leaving the possibility that by the time the PQS Control Update is interpreted by the line card, the AAQST may have already changed. Thus, the present technique can be described as "predictive" with occasional synchronization.

The C1/C2 bits of egress Control iFrame 801B have a "11" value (consistent with Table 5 above), thereby identifying iFrame 801B as a Control iFrame. The M and E bits of ingress Control iFrame 701B are both set to "0" values. The fifth and sixth bits of egress PQS Update Control iFrame 801B have a value of "00".

The last two bits of the first octet in Control iFrame 801B have a Type value of "01", thereby identifying the type of the egress Control iFrame as a PQS Update Control iFrame, as defined by Table 7.

In the described embodiment, the next information contained in the Control iFrame includes one or more PQS Updates that are encoded in octet pairs that include: 2-reserved bits, a 4-bit PQS update increment value for an entry of the $PAQST_j$ table, and a corresponding 10-bit address of the $PAQST_j$ table, including a 2-bit QoS class identifier, and an 8-bit AQS/PQS address. The PQS update increment value, that can vary from 1 to 6, is used to update the addressed location of the predicted available queue space table (PAQST) in the line card $LC_j$.

An error correction code (CRC) is added to the end of the egress PQS Update Control iFrame to protect the entire egress Control iFrame.

Line Card Procedure for SQPP

The procedure for operating the line cards $LC_1$–$LC_{16}$ in accordance with the SQPP protocol will now be described in more detail.

After initialization, all of the cross-point queues in switch fabric 102 are available (i.e., empty). Thus, for the $j^{th}$ line card (j=1 to 16), each of the predicted available queue space values ($PQS_{jkq}$) is set to the maximum value of 6.

The $j^{th}$ line card ($LC_j$) is allowed to send an iFrame to the $k^{th}$ egress port with QoS class q, if and only if $PQS_{jkq}$ is greater than zero. This rule prevents iFrame loss in switch fabric 102.

For the $j^{th}$ line card (LC$_j$), if PQS$_{jkq}$ is equal to B, then this line card LC$_j$ can send B consecutive iFrames to the $k^{th}$ egress port with QoS class q in switch fabric 102. The PQS$_{jkq}$ value is decremented by one after each iFrame is sent to switch fabric 102.

When an SQPP Update (i.e., a PQS Update or an AAQST Update) is received from switch fabric 102, the PQS$_{jkq}$ values in the PAQST$_j$ table are incremented accordingly. Receipt of an SQPP Update implies that switch fabric 102 has forwarded previously sent iFrames, thereby opening storage space for additional iFrames in the cross-point queues of switch fabric 102.

The $j^{th}$ line card LC$_j$ periodically sends an AAQST$_j$ Synchronization Request to switch fabric 102. The purpose of this request is to calibrate each of the PQS$_{jkq}$ entries of line card LC$_j$ with each of the AQS$_{jkq}$ entries of switch fabric 102. The periodic rate of the AAQST Request is a user-configured parameter, $T_{sync}$. When the line card LC$_j$ transmits an AAQST$_j$ Request, this line card LC$_j$ must stop transmitting iFrames to switch fabric 102 until after the line card LC$_j$ receives the requested AAQST$_j$ table and updates the PAQST$_j$ table.

The AAQST$_j$ table sent by switch fabric 102 has the format defined above by Table 1. The AAQST$_j$ table is transmitted from switch fabric 102 to line card LC$_j$ in an iFrame having the format set forth in FIG. 7A. After receiving an AAQST$_j$ table from switch fabric 102, the $j^{th}$ line card LC$_j$ updates PAQST$_j$ table by setting PQS$_{jkq}$=AQS$_{jkq}$ (for k=1 to 16 and q=1 to 4).

If line card LC$_j$ does not receive a response to the AAQST$_j$ Request for a predetermined time period, $T_{timeout}$, then the line card LC$_j$ considers the request expired, and resumes sending iFrames. Another AAQST$_j$ Request is then sent after another $T_{sync}$ period elapses (not counting the $T_{timeout}$ period). The $T_{timeout}$ period is a user-configured parameter.

In addition, the $j^{th}$ line card LC$_j$ can request an AAQST$_j$ table at other times. For example, line card LC$_j$ could use a queue watermark configured to trigger an AAQST$_j$ Update Request when any PQS$_{jkq}$ entry is less than or equal to 1.

The $j^{th}$ line card LC$_j$ is allowed to send a multi-cast iFrame to switch fabric 102, if queue space is available in the required cross points addressed by the multi-cast address. For instance, a multi-cast iFrame can be defined as having a QoS class of q, and r egress switch ports as multi-cast branches. These egress switch ports can be identified as ports $k_1, \ldots, k_r$. The $j^{th}$ line card LC$_j$ is allowed to send the multi-cast iFrame only if the PAQST$_j$ table includes the following entries: PQS$_{j(k1)q}$>0, ..., PQS$_{j(kr)q}$>0. When the multi-cast iFrame is sent, the PQS$_{j(k1)q}$, ..., PQS$_{j(kr)q}$ values are each decremented by one.

As an exception, line card LC$_j$ can be configured to send iFrames to switch fabric 102, even though the PAQST$_j$ table predicts that there is no available queue space in switch fabric 102. The consequence is that the iFrame can be lost in switch fabric 102. Since each QoS class has its own queue in switch fabric 102, the loss of an iFrame in one QoS class will not impact the other QoS classes.

In accordance with another embodiment, the cross-point buffer depth (e.g., 6 in the described examples), is a software configurable parameter. In this embodiment, multiple cross-point buffer depths are supported. Thus, smaller cross-point buffer depths can be used for delay sensitive services like Constant Bit Rate (CBR) and Time Domain Multiplexed (TDM) services that are given a high QoS priority to guarantee that the data is forwarded quickly. Larger cross-point buffer depths can be used when implementing time insensitive services that are given a lower QoS priority, such as Unspecified Bit Rate (UBR) service. There are no time delay guarantees for UBR services. UBR service is sometimes called "best effort", indicating that there is no guaranteed forwarding delay, but is instead handled as well as possible with the circumstances at the moment. UBR is forwarded during otherwise idle periods, when no other service types are waiting. UBR service is therefore given the lowest priority. Providing a deeper buffer for UBR service can be beneficial. The extra buffer depth can hold more iFrames, so that as many iFrames as possible are ready to be transmitted when idle transmission time becomes available.

In accordance with yet another embodiment, the SQPP protocol can be expanded to include other mechanisms, such as a line card backpressure mechanism that prevents overfilling the output buffer of line card LC$_j$.

Switch Fabric Procedure for SQPP

The procedure for operating the switch fabric 102 in accordance with the SQPP protocol will now be described in more detail.

After initialization, all cross-point buffers are available, i.e., AQS$_{jkq}$=M; for j=1, ..., N; k=1, ..., N; q=1, ..., H (e.g., M=6, N=16 and H=4).

After initialization, all of the cross-point queues in switch fabric 102 are available (i.e., empty). Thus, all of the actual available queue space values (AQS$_{jkq}$) are set to the maximum value of 6. Each time switch fabric 102 receives an iFrame from the $j^{th}$ ingress line card LC$_j$, which is to be routed to the $k^{th}$ egress switch port with a QoS class q, the AQS$_{jkq}$ value is decremented by one.

When switch fabric 102 receives a multi-cast iFrame, multiple AAQST table entries are decremented. For instance, a multi-cast iFrame received from the $j^{th}$ line card can be defined as having a QoS class of q, and r egress switch ports as multi-cast branches. These egress switch ports can be identified as ports $k_1, \ldots, k_r$. In these conditions, switch fabric 102 subtracts one from each of the AQS$_{j(k1)q}, \ldots,$ AQS$_{j(kr)q}$ values.

Each time that switch fabric 102 transmits an iFrame from the cross-point queue of the $j^{th}$ ingress switch port and the $k^{th}$ egress switch port with the $q^{th}$ QoS class, the corresponding actual queue space entry AQS$_{jkq}$ is incremented by one. When an opportunity arises, switch fabric 102 transmits a PQS Update either as part of an egress User iFrame or as part of an egress PQS Update Control iFrame to the $j_{th}$ ingress line card LC$_j$, thereby informing this line card LC$_j$ of the newly available queue space.

As described in more detail below, switch fabric 102 is designed to handle incoming Control iFrames separate from the User iFrames. This is so that the processing of the Control iFrames is not delayed by the processing of User iFrames. If Control iFrames were forced to wait behind User iFrames in a cross-point queue, then switch fabric 102 may not discover an important Control iFrame in a timely manner.

When multiple PQS Updates are waiting to be transmitted to a line card LC$_j$, switch fabric 102 selects the order in which the PQS Updates are transmitted based on the following priority levels. Update prioritization is only performed between cross-point queues associated with the same ingress switch fabric port (i.e., cross-point queues that receive from the same line card).

Level 1: Cross-point queues with Update_Count greater than 4.

Level 2: Cross-point queues with Update_Count less than 5, and QoS=00.

Level 3: Cross-point queues with Update_Count less than 5, and QoS=01.
Level 4: Cross-point queues with Update_Count less than 5, and QoS=10.
Level 5: Cross-point queues with Update_Count less than 5, and QoS=11.

Update_Count is the number of PQS Updates pending in a cross-point queue associated with the line card $LC_j$. A PQS Update must be sent immediately for each cross-point queue having a Level 1 priority. If multiple PQS Updates having a Level 1 priority are waiting to be sent, one PQS Update Control iFrame is used to simultaneously send all of the Level 1 updates (See, FIG. 8B). The Level 1 PQS Update Control iFrame has priority over User iFrames.

After the PQS Updates having a Level 1 priority have been sent, PQS updates having a Level 2 priority are sent, followed in order by PQS updates having a Level 3 priority, PQS updates having a Level 4 priority, and PQS updates having a Level 5 priority. PQS Updates having Level 2 to Level 5 priorities are transmitted either appended as part of an egress User iFrame, or, when no User iFrames are waiting, as an egress Update Control iFrame. When transmitted as part of an egress User iFrame, the specified Line Card PQS value is incremented by one and the switch fabric cross point Update Count is decremented by one. When transmitted as an egress Update Control iFrame, the specified Update Count is used to increment the specified line card PQS value and to decrement the specified switch fabric cross point Update Count.

Implementation of the SQPP Based Switching Architecture

There are different ways to implement the SQPP protocol and switching architecture. This section gives one example implementation.

Line Card Architecture

Figure 9:
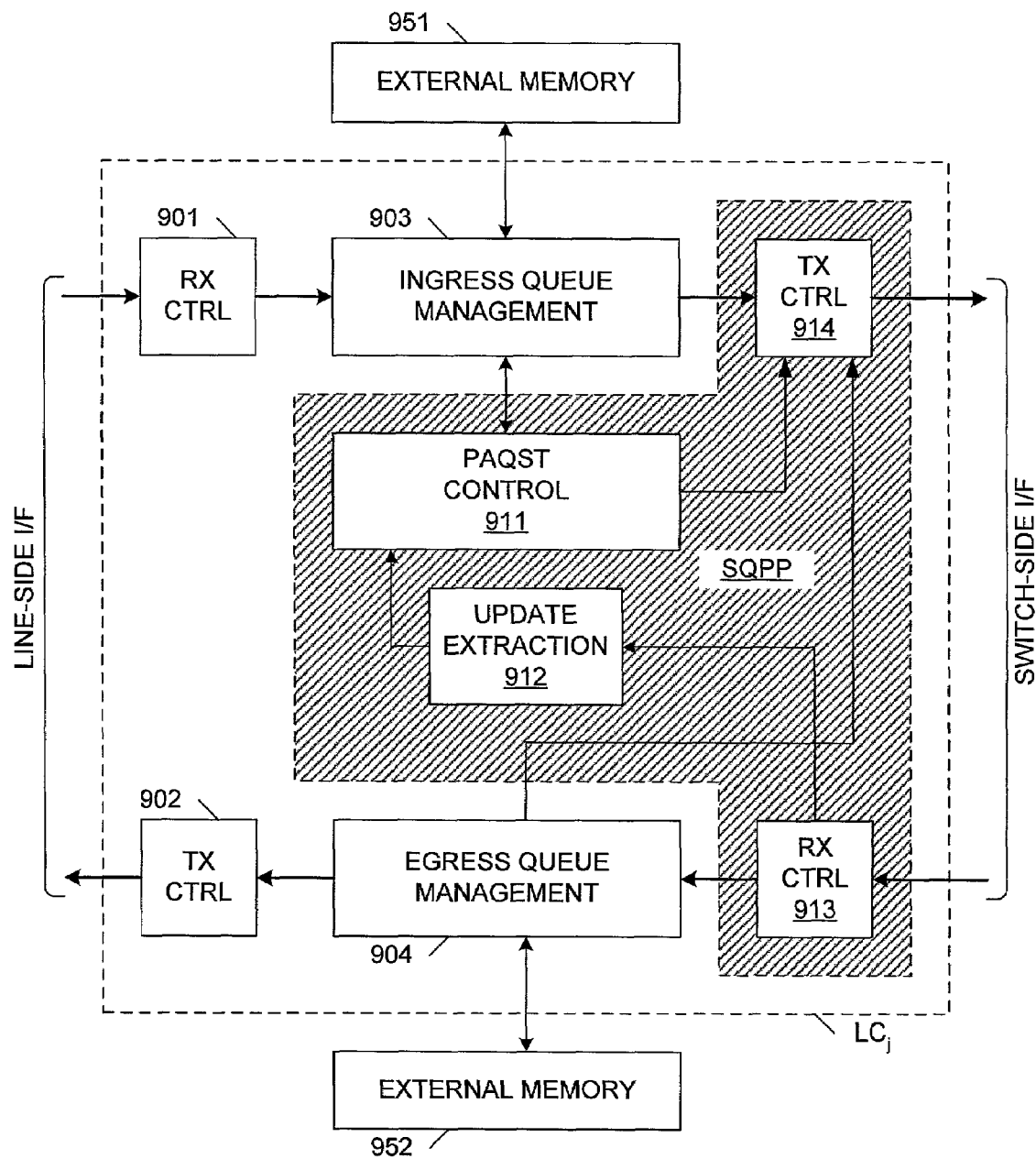
FIG. 9 is a block diagram illustrating a line card architecture in accordance with one embodiment of the present invention.

FIG. 9 is a block diagram illustrating the line card architecture in accordance with one embodiment of the present invention. The line card architecture 900 includes line-side receive controller 901, line-side transmit controller 902, ingress queue management block 903, which is coupled to external memory 951 for input buffering, and egress queue management block 904, which is coupled to external memory 952 for output buffering. Line card architecture 900 also includes four primary functions associated with the SQPP protocol, including: PAQST control block 911, update extraction block 912, switch-side interface receive controller 913, and switch-side interface transmit controller 914. These four SQPP functions 911–914 are described in more detail below.

PAQST Control Block

PAQST control block 911 performs the following functions. First, PAQST control block 911 maintains the PAQST table for the line card. For the 16-port switch fabric 102 with 4 quality of service levels, there are a total of 4*16=64 entries in this table. (See, Table 2 above.) PAQST control block 911 updates the PAQST table entries when iFrames are transmitted to switch fabric 102, or PQS Updates are received from switch fabric 102. PAQST control block 911 receives the PQS Updates from update extraction block 912 through switch-side receive controller 913.

PAQST control block 911 also periodically initiates a synchronization process. The time interval between two consecutive synchronization processes is $T_{sync}$. The synchronization process is implemented by transmitting an AAQST Request to switch fabric 102, thereby causing switch fabric to transmit the AAQST table to the line card. The PAQST control block 911 then updates the PAQST table using the values in the received AAQST table.

PAQST control block 911 also monitors the PAQST table to determine when a queue watermark has been exceeded, and then transmits an AAQST Request to switch fabric 102 in order to obtain the actual queue space values.

Queue Space Update Extraction Block

Update extraction block 912 extracts the PQS Update signals from the User Switching Tag of iFrames received by switch-side receive controller 913. Update extraction block 912 passes these PQS Updates to PAQST control function block 911. Update extraction block 912 also extracts AAQST tables from Control iFrames, and passes these AAQST tables to PAQST control block 911.

Switch-Side Interface Receive Controller

Switch-side receive controller 913 detects the start and end of received iFrames. Receive controller 913 also provides a buffer to hold one or two iFrames for processing within this block. Receive controller 913 passes PQS Updates to update extraction block 912. Receive controller 913 also detects Control iFrames, and provides these Control iFrames to update extraction block 912. Receive controller 913 removes the SQPP User Switching Tag from incoming User iFrames before passing the User payload to the Egress Queue Management block 904.

Switch-Side Interface Transmit Controller

The switch-side transmit controller 914 generates Ingress User and Control iFrames. User iFrames are generated by creating a User iFrame Switching Tag for each user data packet received from the Ingress Queue Management block 903 and using the user data as the iFrame User Data (Payload). Ingress Control iFrame signals are generated by the switch-side transmit controller 914 when the PAQST Control block 911 indicates the need for an AAQST Request or when a Purge Control iFrame is required (e.g., after power up). Switch-side transmit controller 914 generates the start and end of transmitted iFrames. Transmit controller 914 also provides a buffer to hold one or two iFrames prior to transmission.

PAQST control block 911 may also predict when one or more switch fabric cross point queues associated with that line card are full (AQS=0) based on the associated PQS value (PQS=0). When this occurs, the PAQST control block 911 sends a congestion indication signal to the Ingress Queue Management block 903 to not send iFrames for that congested (full) cross point queue. The Ingress Queue Management block 903 is only allowed to send iFrames for cross point queues that are not congested. When congestion of a cross point queue is no longer predicted (Updates have been received for that cross point queue making PQS>0) then the PAQST control block 911 removes the congestion indication for that cross point queue and the Ingress Queue Management block 903 is allowed to resume sending iFrames to that cross point queue.

The Egress Queue Management block 904 may also detect egress queue congestion in the output buffer. Egress congestion is dependent on the size of the output buffer 952 that has been configured for a particular QoS, the rate that the switch-side interface receive controller 913 receives packets for that QoS, and the rate at which the line-side transmit controller 902 transmits the data for that QoS. In general, the output buffer and its mechanisms are not described by the SQPP protocol. The important point, however, is that if egress congestion occurs, a signal is provided from the Egress Queue Management 904 to the SQPP procedures (i.e., transmit controller 914), thereby preventing additional data from being sent until the egress queue congestion is cleared.

Egress queue congestion can be explained as follows. In many cases, the line-side interface of the Line Card (see, e.g., FIG. 9) is slower than the speed of the switch-side interface. For example, the switch-side interface may be designed to support multiple line card types (e.g. a 2.5 Gigabit/sec SONET line card and a 1 Gigabit/second Ethernet line card). If the switch-side interface is designed to support the maximum line card rate, then the output port can become congested when the line-side interface does not run as fast as the switch-side interface. For example if the switch-side interface supplies data at 2.5 Gb/s, but the line-side interface only supports 1 Gb/s, then data can accumulate and potentially overflow in the output buffer 952. The SQPP protocol can be implemented with or without the egress congestion mechanism. Without the mechanism, the chance of dropping packets is higher than if the mechanism is employed. This results in a trade-off between complexity and an increased probability that packets will be lost.

Upon detecting egress queue congestion, egress queue management block 904 sends an egress congestion indication to transmit control block 914. In response, transmit control block 914 may embed an egress congestion indication signal within an outgoing ingress User Switching Tag or within an outgoing ingress Control iFrame. This egress congestion indication signal in one embodiment may be coded using the reserved bits of the ingress User Switching Tag or the Reserved bits of the ingress AAQST Request iFrame. Other coding techniques are also possible using the ingress iFrame headers. Using 2 bits, the egress congestion indication signal can be used to indicate four states: no congestion, congestion on QoS level 2, congestion on QoS level 3, or congestion on QoS level 4. With this scheme, it is assumed that QoS level 1 is time critical and cannot regard a congestion condition so that if congestion occurs, the iFrame data is discarded. In an alternate embodiment, the egress congestion indication signal can be encoded with one bit to indicate a general egress congestion condition. When only one bit is used, the result may be that all egress transmission to the corresponding line card is stopped or that all egress transmission for specific QoS levels is stopped. For example, transmission of QoS levels 1 and 2 may continue to be transmitted, while transmission of QoS levels 3 and 4 are stopped.

The encoded egress congestion indication transmitted from the line card (destination line card) to the switch fabric 102 stops the switch fabric 102 from transmitting more data to the destination line card, because the destination line card output buffer 962 cannot accept any more data. If a line card (source line card) attempts to send iFrames to the congested destination line card while the egress congestion indication signal for the destination line card is active, the PQS count in the source line card will eventually reach a "0" value (e.g., after sending 6 iFrames, or when the cross-point queue in the switch fabric 102 becomes full). When the source line card's PQS value becomes "0", the source line card stops sending iFrames for the destination line card. When the destination line card is able to remove the egress congestion by transmitting data from the output buffer 952 to the line-side interface, egress queue management 904 de-asserts the egress congestion indication signal. In response, the switch side transmit controller 914 transmits an encoded signal to the switch fabric 102, thereby indicating that the egress congestion condition has been removed. At this time, the switch fabric 102 is allowed to resume sending iFrames to the destination line card, and in turn sends PQS updates to the source line card for those iFrames. When the source line card begins receiving PQS Updates for that destination line card, the corresponding PQS value in the source line card increments to a value greater than "0", thus allowing the source line card to resume sending iFrames to the switch fabric 102 for that destination line card.

Switch Fabric Architecture

Figure 10:
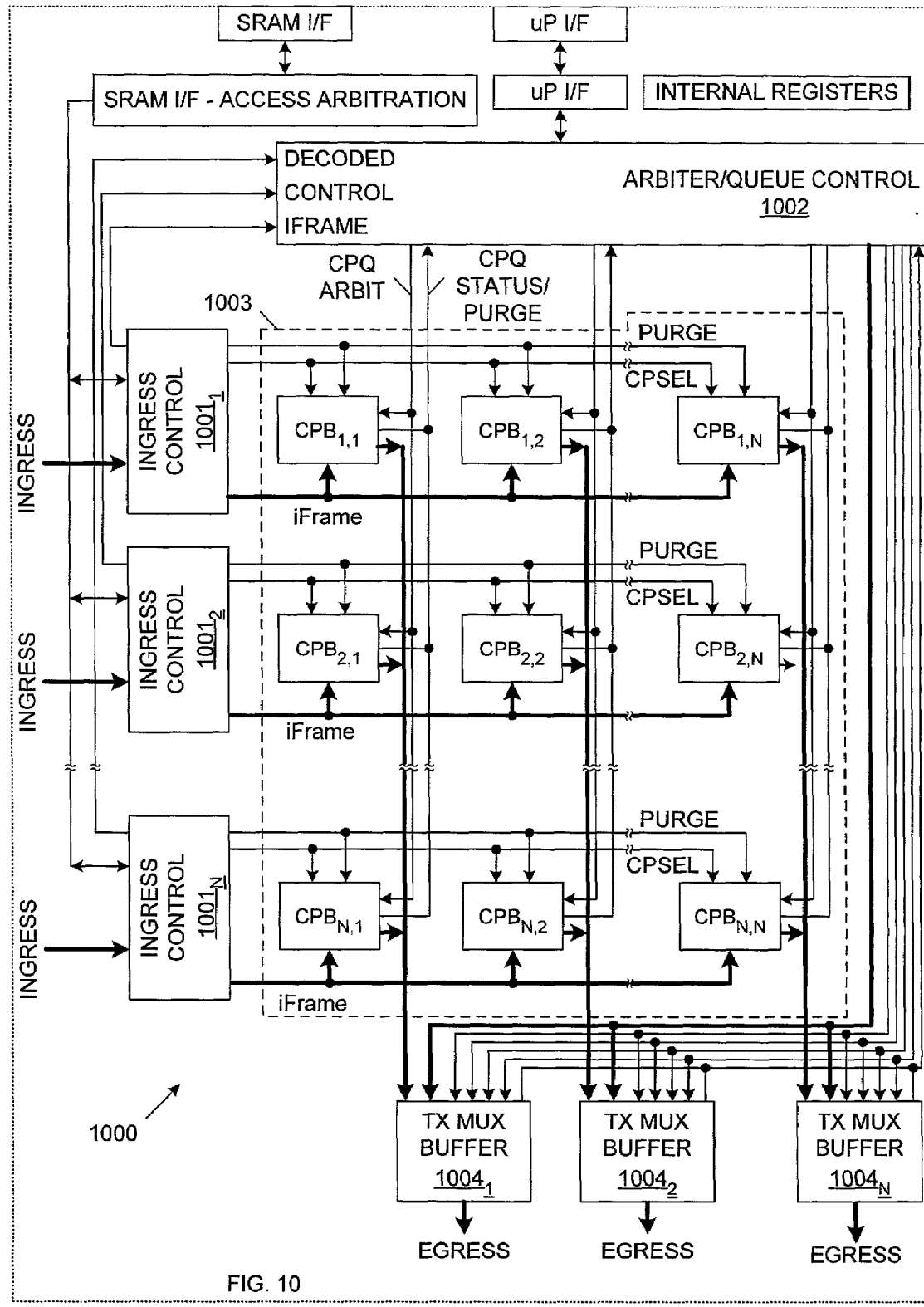
FIG. 10 is a block diagram illustrating a switch fabric architecture in accordance with one embodiment of the present invention.

FIG. 10 is a block diagram illustrating the switch fabric architecture 1000 in accordance with one embodiment of the present invention. The switch fabric architecture 1000 includes ingress control function blocks $1001_1$–$1001_N$, . . . arbiter/queue control unit 1002, cross-point queue block 1003, and transmit multiplexers/buffers $1004_1$–$1004_N$.

Ingress Control Function Block

Each of ingress control function blocks $1001_1$–$1001_N$ detects the start of an iFrame signal and the end of an iFrame signal for each of the incoming iFrames. In addition, each of ingress control function blocks $1001_1$–$1001_N$ provides a buffer to temporarily hold one or two iFrames for further processing. Each of blocks $1001_1$–$1001_N$ also decodes the User Switching Tag of each received iFrame, thereby enabling each block to generate a cross-point queue select signal (CPSEL), which is used to select the proper cross-point queue (according to the egress switch port address and QoS class). For example, ingress control function block $1001_1$ decodes each iFrame received from line card $LC_1$, and in response, generates the CPSEL signal, which is applied to cross-point buffers $CPB_{1,1}$–$CPB_{1,N}$. The CPSEL signal enables one (uni-cast) or more (multi-cast) of these cross point buffers to store the iFrame. The CPSEL signal also selects the appropriate cross-point queue within the selected cross-point buffer, in accordance with the QoS class identified by the iFrame.

Each of ingress control function blocks $1001_1$–$1001_N$ transmits the iFrames to the corresponding row of cross point buffers in cross-point switch 1003. For example, ingress control function block $1000_1$, transmits received iFrames to cross-point buffers $CPB_{1,1}$–$CPB_{1,N}$. The iFrames are written to the cross-point buffers (queues) selected by the CPSEL signal. These cross-point queues are hereinafter referred to as the destination cross-point queues.

The Ingress Control blocks $1001_1$–$1001_N$ pass the MCID of an ingress multi-cast user iFrame to the SRAM interface block. The MCID is used as an address for performing a read operation on an external SRAM. The data that is retrieved from the SRAM is returned to the same Ingress Control block $1001_1$–$1001_N$ that originated the Read operation. The returned data indicates which cross point queues to which the ingress multi-cast user iFrame is to be forwarded.

Each of the ingress control function blocks $1001_1$–$1001_N$ informs arbiter/queue controller 1002 when each destination cross-point queue receives a new iFrame. For a multi-cast iFrame, each of the destination cross-point queues is considered to have received a new iFrame.

In addition, each of the ingress control function blocks $1001_1$–$1001_N$ processes any control commands embedded in the User Switching Tags of the received iFrames, including generating cross-point purge signals (PURGE), and passing any AAQST Update Requests or Backpressure commands to arbiter/queue controller 1002.

Arbiter/Queue Control Unit

Arbiter/Queue Control Unit 1002 handles the egress switch port arbitration and AAQST processing required by the SQPP protocol. Arbiter/Queue Control Unit 1002 performs the following tasks.

Arbiter/Queue Control Unit 1002 maintains one $AAQST_j$ table for each of the j switch fabric ports. For the 16-port switch fabric 102, there are 16 $AAQST_j$ tables, each with 4*16=64 cross-point queues or a total of 64*16=1024 cross-point queues for the entire AAQST table. An example of one $AAQST_j$ table is provided above in Table 1.

Arbiter/Queue Control Unit 1002 determines the unused length of each cross-point queue from the AAQST table. For instance, the queue at the cross-point of ingress switch port 1 and egress switch port 1 having QoS class 1 ($AQS_{111}$) may have a value of 6.

Arbiter/Queue Control Unit 1002 updates the AAQST table entries when iFrames are received or transmitted. As described above, Arbiter/Queue Control Unit 1002 is informed when ingress control blocks $1001_1$–$1001_N$ receive iFrames. As described below, Arbiter/Queue Control Unit 1002 controls the transmission of iFrames from the cross-point queues to the egress switch ports, and thereby knows when iFrames are transmitted.

The arbiter function of Arbiter/Queue Control Unit 1002 can be logically divided into 16 independent sub-arbiters. In this case, each sub-arbiter serves one egress switch port. Each sub-arbiter will arbitrate among the 16 buffers along the egress switch port. For example, one sub-arbiter may arbitrate among the sixteen cross-point buffers $CPB_{1,1}$–$CPB_{N,1}$. Different scheduling algorithms can be utilized. For instance, weighted round robin scheduling can be used for some QoS classes, while calendar based scheduling can be used for other QoS classes. A priority scheduling policy can be applied across different QoS classes so that higher priority QoS classes receive service before lower priority QoS classes. For the arbitration algorithm, only iFrames stored in the cross-point queues can be scheduled. In other words, an iFrame cannot be received and transmitted in the same cycle.

Arbiter/Queue Control Unit 1002 also generates and sends PQS Updates to the line cards $LC_1$–$LC_6$. The PQS Updates are sent to the Transmit Multiplexer/Buffer circuits $1004_1$–$1004_N$ via an Update iFrame path. Each sub-arbiter schedules the order in which PQS Updates are returned to the line cards $LC_1$–$LC_{16}$. When multiple PQS Updates are waiting to be returned, PQS Updates for higher priority QoS classes are returned first. Similar algorithms that are used for scheduling iFrames queues can be used to schedule the returned PQS updates.

Arbiter/Queue Control Unit 1002 also generates and sends Control iFrames to indicate the current $AAQST_k$ table values when requested by incoming Control iFrames. Arbiter/Queue Control Unit 1002 generates the $AAQST_k$ table to be sent back to the $k^{th}$ line card in the same manner illustrated by Table 1 above.

Arbiter/Queue Control Unit 1002 also generates arbitration signals (CPQ ARBIT) to select which cross-point queue is to transmit an iFrame.

Cross-Point Queue Block

Each of cross-point buffers $CPB_{1,1}$–$CPB_{N,N}$ performs the following functions.

Each of cross-point buffers $CPB_{1,1}$–$CPB_{N,N}$ selected by a CPSEL signal reads the iFrames provided on a data bus by the corresponding one of ingress control blocks $1001_1$–$1001_N$, and queues these iFrames according to their QoS class.

Each of cross-point buffers $CPB_{1,1}$–$CPB_{N,N}$ writes a queued iFrame onto a corresponding data bus when selected by arbiter/queue controller 1002.

Each of cross-point buffers $CPB_{1,1}$–$CPB_{N,N}$ purges its cross-point queues upon receiving a PURGE signal from its corresponding ingress control block.

Finally, each of cross-point buffers $CPB_{1,1}$–$CPB_{N,N}$ provides delineation between two iFrames.

Transmit Multiplexer/Buffer Circuits

Each of transmit multiplexer/buffer circuits $1004_1$–$1004_N$ performs the following functions.

Each of transmit multiplexer/buffer circuits $1004_1$–$1004_N$ generates the start/end of iFrame signal for each transmitted iFrame. Each of transmit multiplexer/buffer circuits $1004_1$–$1004_N$ also provides a buffer to temporarily hold one or two iFrames for transmission. Moreover, each of transmit multiplexer/buffer circuits $1004_1$–$1004_N$ receives PQS Updates from the arbiter/queue controller 1002, and appends these PQS Updates onto the PQS Update field of the User Switching Tag of iFrames, as the iFrames are transmitted.

Although the invention has been described in connection with several embodiments, it is understood that this invention is not limited to the embodiments disclosed, but is capable of various modifications, which would be apparent to a person skilled in the art. Thus, the invention is limited only by the following claims.

The invention claimed is:

1. A packet switching system comprising:
   a switch fabric having a cross-point switch, wherein a cross-point buffer is located at each cross-point of the cross-point switch, and a plurality of actual available queue space tables (AAQSTs), each identifying the actual queue space available in a set of the cross-point buffers; and
   a plurality of line cards, each coupled to the switch fabric, and each having an input buffer, an output buffer, and a predicted available queue space table (PAQST) identifying predicted queue space available in a set of the cross-point buffers.

2. The packet switching system of claim 1, wherein each of the cross-point buffers comprises a plurality of cross-point queues.

3. The packet switching system of claim 2, wherein each of the cross-point queues in a cross-point buffer supports a different quality of service class.

4. The packet switching system of claim 1, wherein each of the cross-point buffers includes one or more entries.

5. The packet switching system of claim 1, wherein each line card further comprises a line card function for converting an input data packet having a first format into one or more internal frames having a second format.

6. The packet switching system of claim 5, wherein the second format includes a user switching tag followed by a data payload.

7. The packet switching system of claim 6, wherein each of the internal frames has a maximum length L.

8. The packet switching system of claim 7, wherein the line card function is configured to generate variable length internal frames.

9. The packet switching system of claim 5, wherein each of the line card functions is configured to maintain a corresponding PAQST.

10. The packet switching system of claim 1, further comprising means for modifying an entry of a PAQST of a line card when the line card transmits an internal frame to the switch fabric.

11. The packet switching system of claim 1, wherein the switch fabric comprises means for modifying an entry of an AAQST when the switch fabric receives an internal frame from a line card.

12. The packet switching system of claim 1, wherein the switch fabric comprises means for modifying an entry of an AAQST when the switch fabric transmits an internal frame to a line card.

13. The packet switching system of claim 1, wherein the switch fabric comprises means for transmitting an update signal for modifying a PAQST in a line card when the switch fabric transmits an internal frame to the line card.

14. The packet switching system of claim 1, wherein each line card further comprises means for periodically transmitting an update request to the switch fabric.

15. The packet switching system of claim 14, further comprising means for transmitting an AAQST from the switch fabric to a line card in response to an update request.

16. The packet switching system of claim 15, wherein each line card further comprises means for updating the corresponding PAQST in response to an AAQST transmitted by the switch fabric.

17. The packet switching system of claim 1, wherein each line card further comprises:
- an egress queue management circuit for monitoring the corresponding output buffer in the line card, and asserting an egress congestion indication signal when the output buffer in the line card is nearly full and unable to store more data from the switch fabric because a receive rate of the line card is greater than a transmit rate of the line card; and
- a transmit control circuit coupled to receive the egress congestion indication signal, wherein the transmit control circuit forwards the egress congestion indication signal to the switch fabric, thereby causing the switch fabric to stop sending data to the line card until the egress congestion indication signal is no longer asserted.

* * * * *